(12) United States Patent
Scott et al.

(10) Patent No.: US 12,362,828 B2
(45) Date of Patent: Jul. 15, 2025

(54) OPTICAL COMMUNICATION SYSTEM USING A PHOTONIC LANTERN FOR FINE POINT TRACKING

(71) Applicant: Honeywell Limited Honeywell Limitée, Mississauga (CA)

(72) Inventors: Alan Scott, Arnprior (CA); Hugh Podmore, Toronto (CA); Sheng Hai Zheng, Ottawa (CA)

(73) Assignee: Honeywell Limited Honeywell Limitée, Mississauga (CA)

( * ) Notice: Subject to any disclaimer, the term of this patent is extended or adjusted under 35 U.S.C. 154(b) by 470 days.

(21) Appl. No.: 17/716,602

(22) Filed: Apr. 8, 2022

(65) Prior Publication Data

US 2023/0327761 A1    Oct. 12, 2023

(51) Int. Cl.
*H04B 10/2519* (2013.01)
*H04B 10/54* (2013.01)

(52) U.S. Cl.
CPC ......... *H04B 10/2519* (2013.01); *H04B 10/54* (2013.01)

(58) Field of Classification Search
CPC ............ H04B 7/18513; H04B 7/18521; H04B 10/118; H04B 10/11; H04B 10/1121; H04B 10/2581
See application file for complete search history.

(56) References Cited

U.S. PATENT DOCUMENTS

| | | | |
|---|---|---|---|
| 9,322,992 B2 | 4/2016 | Woodward et al. | |
| 9,692,515 B2 | 6/2017 | Chen et al. | |
| 9,810,862 B2 | 11/2017 | Graves et al. | |
| 9,964,396 B1 * | 5/2018 | Scott | G01B 9/02051 |
| 10,122,447 B2 | 11/2018 | Takahashi et al. | |
| 10,411,802 B2 | 9/2019 | Tanaka et al. | |
| 10,715,251 B2 | 7/2020 | Li | |
| 10,768,370 B1 | 9/2020 | Esman | |
| 10,892,824 B2 | 1/2021 | Geisler et al. | |
| 10,996,399 B2 | 5/2021 | Yang et al. | |

(Continued)

FOREIGN PATENT DOCUMENTS

| | | | |
|---|---|---|---|
| CA | 2973120 A1 * | 5/2018 | ......... G01B 9/02027 |
| CN | 106895959 B | 1/2019 | |

(Continued)

OTHER PUBLICATIONS

KR 20240128147 A (English Translation) (Year: 2024).*

(Continued)

*Primary Examiner* — Thomas A Hollweg
*Assistant Examiner* — Mary A El-Shammaa

(57) ABSTRACT

An optical communication system using a photonic lantern for fine point tracking is disclosed. The optical communication system may comprise a photonic lantern, a signal processing unit including one or more fiber splitters to sample a fraction of a received signal in each single mode fiber of the photonic lantern, and one or more intensity sensors positioned in one arm of each fiber splitter, and used for monitoring fiber-specific intensity data associated with each of the single-mode fibers. The system may further include a fine pointing assembly and a controller for controlling a driver of the fine pointing assembly.

20 Claims, 16 Drawing Sheets

(56) References Cited

U.S. PATENT DOCUMENTS

| | | | |
|---|---|---|---|
| 11,770,189 B2* | 9/2023 | Scott | H04B 10/2581 398/72 |
| 2014/0186040 A1 | 7/2014 | Fujiwara et al. | |
| 2015/0098697 A1 | 4/2015 | Marom et al. | |
| 2017/0336248 A1 | 11/2017 | Galtarossa et al. | |
| 2018/0259825 A1 | 9/2018 | DeSalvo et al. | |
| 2020/0083659 A1 | 3/2020 | Reeves-Hall et al. | |
| 2020/0186248 A1 | 6/2020 | Chamberlain et al. | |
| 2020/0333441 A1 | 10/2020 | Diaz | |
| 2020/0343973 A1* | 10/2020 | Geisler | H04J 14/0221 |
| 2021/0018737 A1 | 1/2021 | Salla et al. | |
| 2021/0278706 A1 | 9/2021 | Montoya et al. | |
| 2021/0351844 A1* | 11/2021 | Iranzad | H04B 10/1125 |
| 2023/0093006 A1* | 3/2023 | Scott | H04J 14/02 398/72 |
| 2024/0272000 A1* | 8/2024 | Eikenberry | G01J 3/0218 |

FOREIGN PATENT DOCUMENTS

| | | | | |
|---|---|---|---|---|
| CN | 110098868 A | | 8/2019 | |
| CN | 113281845 A | | 8/2021 | |
| GB | 2534917 A | | 8/2016 | |
| KR | 2024128147 A | * | 8/2024 | G02B 6/14 |
| WO | 2010/090364 A1 | | 8/2010 | |
| WO | 2021/154082 A1 | | 8/2021 | |

OTHER PUBLICATIONS

Fontaine et al., "Geometric requirements for photonic laterns in space division multiplexing", Nov. 19, 2012 / vol. 20, No. 24 Optics Express (10 pages).

Birks et al.. "The Photonic Lantern", Adv. Opt. Photon., 2015, 7: 107-167.

Belmonte et al., "Field Conjugation Adaptive Arrays in Free-Space Coherent Laser Communications", IEEE/OSA Journal of Optical Communications and Networking. 2011. 3(11): 830-838.

Cai et al., "Free-space optical relaying system with few-mode all-optical relay", Optics Communications, 2019, 439: 164-170.

Liu, "Mode Coupling in Space-division Multiplexed Systems", 2019, University of Central Florida, Stars, Electronic Theses and Dissertations, 6754, pp. 1-82.

Zhang et al., "All-fiber photonic lantern multimode optical receiver with coherent adaptive optics beam combining", arXiv:2105.09516. May 2021, pp. 1-7.

Tedder et al., "Single-Mode Fiber and Few-Mode Fiber Photonic Lanterns performance evaluated for use in a Scalable Real-time Photon Counting Ground Receiver", Proc. SPIE, 2019, 10910: 109100G (10 pages).

Diab et al., "Starlight coupling through atmospheric turbulence into few-mode fibers and photonic lanterns in the presence of partial adaptive optics correction", arXiv:2011.134232020, 2020, pp. 1-12.

Oran et al., "Performance Evaluations of Single Mode Optical Receiver for Degraded Visual Field and Photonic Lantern Based Coherent Detection", Master Thesis, Abdullah Gül University, 2016, pp. 1-73.

Saval et al.. "Photonic lanterns: a study of light propagation in multimode to single-mode converters", Optics Express, 2010, 18(8): 8430-8439.

Ahrens et al., "Optical MIMO Multi-mode Fiber Transmission using Photonic Lantems", In Proceedings of the 14th International Joint Conference on e-Business and Telecommunications (ICETE 2017), vol. 3: Optics, pp. 24-31.

Billault et al., "Free space optical communication receiver based on a spatial demultiplexer and a photonic integrated coherent combining circuit", Optics Express, Sep. 29, 2021 (Oct. 2021), 29(21): 33134-33143.

Liu et al., "3x10 GB/s mode group-multiplexed transmission over a 20 km few-mode fiber using photonic lantems", Optical Fiber Communication Conference 2017, Los Angeles, CA, Mar. 19-23, 2017 (3 pages).

Sampson et al., "Turbulence-resistant free-space communication using few-mode preamplifiers", Proc. SPIE, 2019, 10947: 1094707-1 to -7.

Velázquez-Benítez et al., "Scaling photonic lanterns for space-division multiplexing", Scientific Reports, 2018, 8:8897, pp. 1-9.

Cruz-Delgado et al., "Control over the transverse structure and long-distance fiber propagation of light at the single-photon level", Scientific Reports, 2019, 9: 9015, pp. 1-9.

Norris et al., "An all-photonic focal-plane wavefront sensor", Nat. Commun., 2020, 11: 5335 (2020).

* cited by examiner

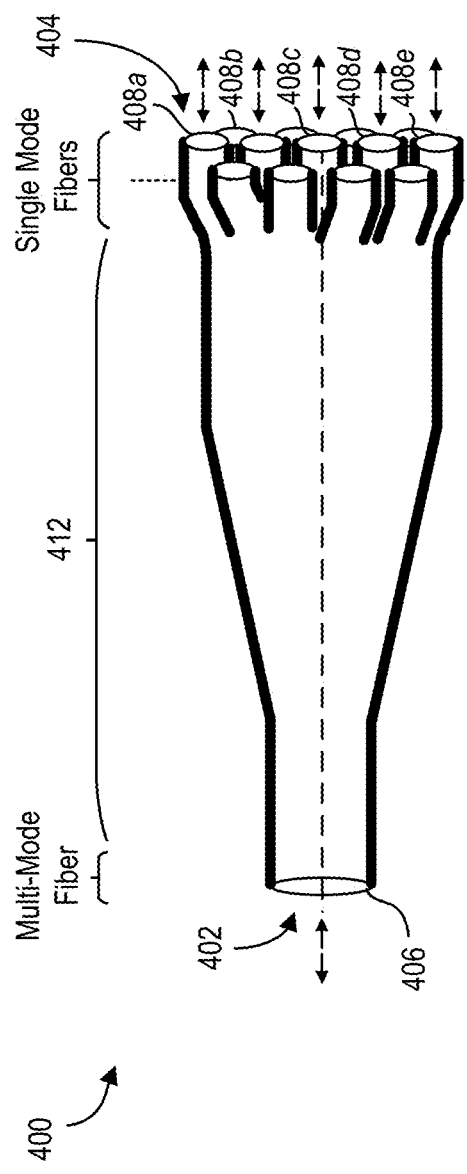
FIG. 4A (PRIOR ART)
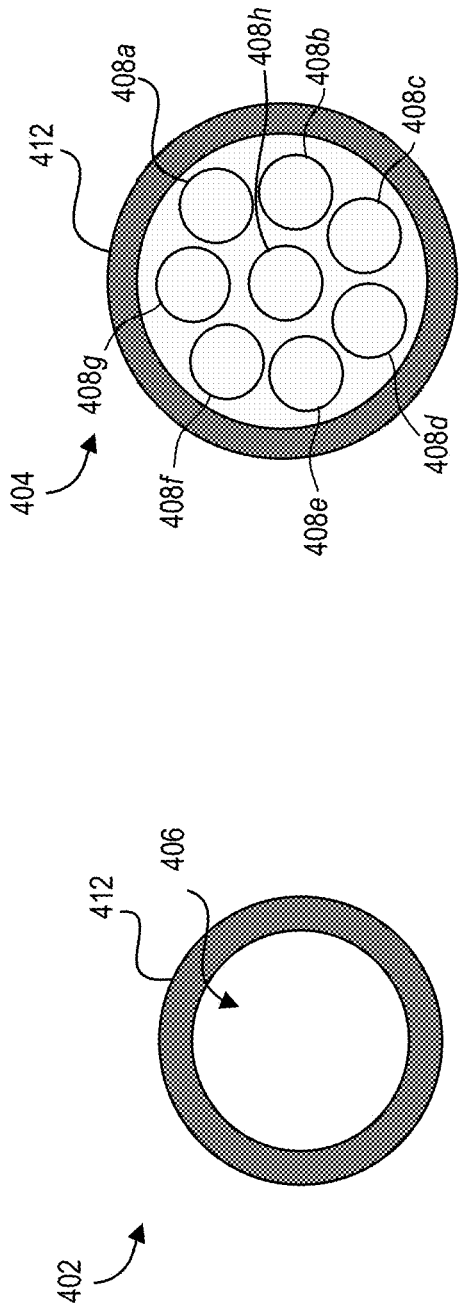
FIG. 4C (PRIOR ART)
FIG. 4B (PRIOR ART)

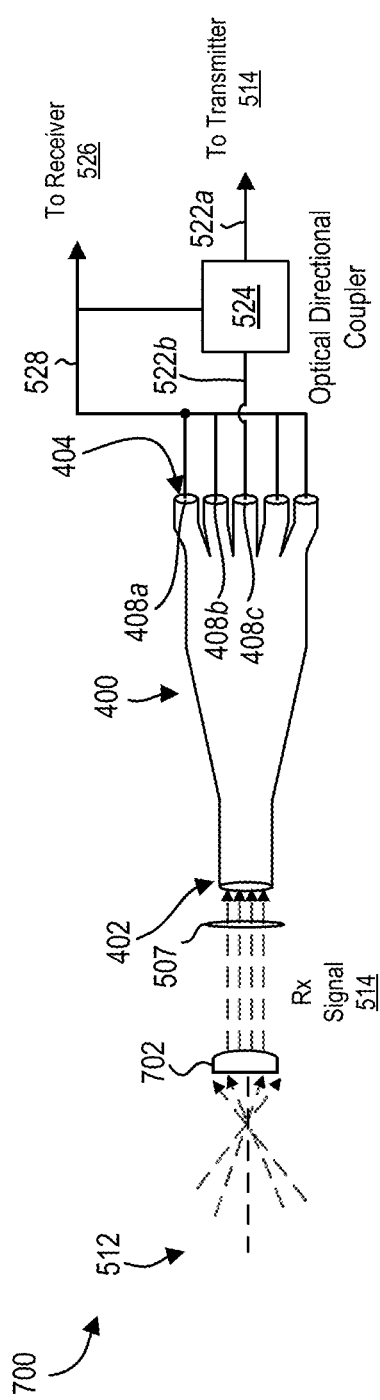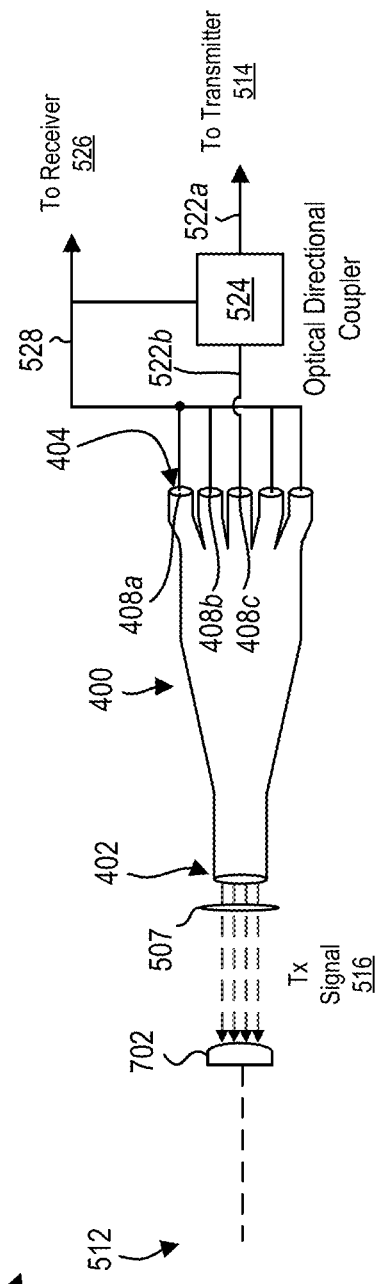
FIG. 7A
FIG. 7B

OPTICAL COMMUNICATION SYSTEM USING A PHOTONIC LANTERN FOR FINE POINT TRACKING

FIELD

The present disclosure relates generally to optical communication systems, and in particular, to an optical communication system using a photonic lantern for fine point tracking.

INTRODUCTION

The following is not an admission that anything discussed below is part of the prior art or part of the common general knowledge of a person skilled in the art.

Free space optical (FSO) communication links can be established between various optical communication terminals. For example, FSO links can occur between one or more satellites (i.e., inter-satellite FSO links), between satellites and ground-terminals, as well as between different ground-terminals.

SUMMARY

The following introduction is provided to introduce the reader to the more detailed discussion to follow. The introduction is not intended to limit to define any claim or as yet unclaimed invention. One or more inventions may reside in any combination or sub-combination of elements or process steps disclosed in any part of this document including its claims and figures.

In accordance with at least one example, there is provide an optical communication system, comprising: a photonic lantern, the photonic lantern extending between a first open end and a second open end, wherein, the first open end comprises an opening to a single multi-mode fiber, the first open end being coupled to an external signal path, and the second open end comprises a plurality of single mode fibers adiabatically coupled to the multi-mode fiber, the plurality of single-mode fibers include a single-mode fiber adapted to carry a fundamental optical mode and the remaining single-mode fibers adapted to carry higher-order optical modes, and at least one of the single-mode fibers is coupled to a signal transmitting path, and the remaining single-mode fibers are coupled to a signal receiving path; a signal processing unit coupled to the at least one single-mode fiber via an optical directional coupler, and to the remaining single-mode fibers via separate receiving path connections, wherein the signal processing unit includes one or more fiber splitters to sample a fraction of the received signal in each single mode fiber; one or more intensity sensors positioned in one arm of each fiber splitter, and used for monitoring fiber-specific intensity data associated with each of the single-mode fibers; a fine pointing assembly, disposed along the external signal path, and upstream of the photonic lantern, the fine pointing assembly comprising a fast steering optical element and a driver for controlling the fast steering optical element; a controller coupled to the one or more intensity sensors and the driver, the controller and being configured to: receive, from the one or more intensity sensors, the fiber-specific intensity data associated with each of the single-mode fibers; based on the fiber-specific intensity data, determine a configuration of an incident wavefront on the fast steering mirror, wherein the configuration is determined using a neural network model trained to associate a non-linear relationship between fiber-specific intensity data and the incident wavefront configuration; and based on the determined incident wavefront configuration, transmit control data to the driver to control the fast steering mirror to stabilize the incident wavefront.

In some example cases, the incident wavefront configuration comprises the wavefront phase and wavefront amplitude.

In some example cases, the neural network model associates fiber-specific intensity data to Zernike terms associated with the incident wavefront.

In some example cases, the signal processing unit comprises an in-line fiber wavelength filter, a pre-amplifier array and a phase shifting array.

In some example cases, the in-line fiber wavelength filter comprises a Fiber Bragg Grating (FBG) array.

In some example cases, the fiber splitters are positioned between the pre-amplifier array and the phase shifting array.

In some example cases, the controller is further configured to transmit phase data for each mode, based on the configuration of the incident wavefront, to the phase shifting array.

In some example cases, the phase shifting array perform phase shift compensation between multiple single modes to generate a single mode received signal.

In some example cases, the at least one single-mode fiber coupled to the signal transmitting path corresponds to the fundamental mode, and the photonic lantern is a mode-specific lantern.

In some example cases, the optical directional coupler comprises an optical circulator.

In some example cases, the photonic lantern comprises a generic photonic lantern, wherein the transmit path is configured by adjusting the distribution of phase offsets from a plurality of single mode transmit fibers into a desired free space propagating optical mode, this mode being of Gaussian distribution or a combination of multiple co-propagating modes.

In some example cases, the signal processing unit is coupled to a plurality of single mode fibers via a plurality of respective optical directional couplers.

In some example cases, an optical transmitting unit is coupled to the signal transmitting path.

In some example cases, an optical receiving unit coupled to the signal receiving path.

In some example cases, the one or more intensity sensors comprise monitoring photodiodes.

Other features and advantages of the present application will become apparent from the following detailed description taken together with the accompanying drawings. It should be understood, however, that the detailed description of the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

The drawings included herewith are for illustrating various examples of systems, methods, and devices of the present specification and are not intended to limit the scope of what is taught in any way. In the drawings:

FIG. 4A shows an example photonic lantern;

FIG. 4B shows a view of an example first end of an example photonic lantern;

FIG. 4C shows a view of an example second end of an example photonic lantern;

FIG. 7A shows an example optical communication system using a standard photonic lantern and illustrates an example case where an optical signal is being received;

FIG. 7B shows an example optical communication system using a standard photonic lantern and illustrates an example case where an optical signal is being transmitted;

Further aspects and features of the examples described herein will appear from the following description taken together with the accompanying drawings.

DETAILED DESCRIPTION

Figure 1:
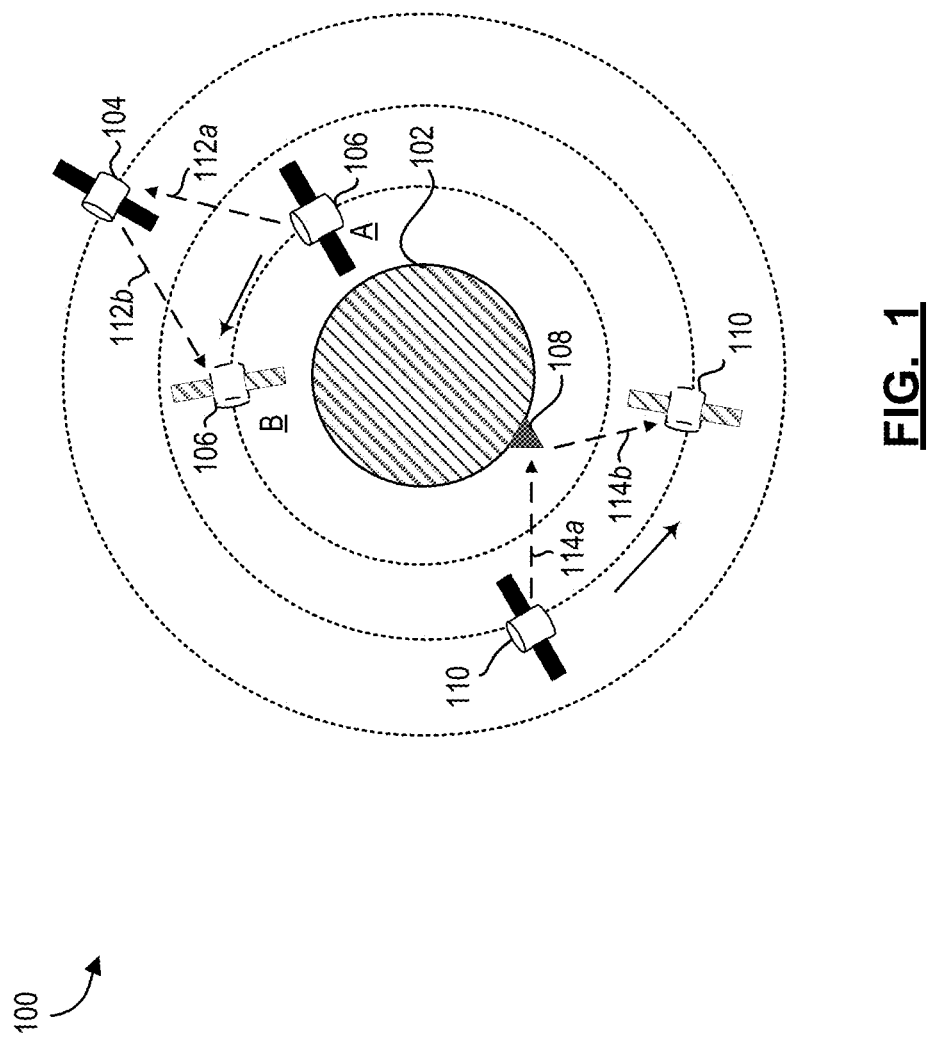
FIG. 1 shows an example environment for operating one or more free space optical (FSO) communication systems.

Reference is now made to FIG. 1, which shows an example environment 100 for operating free space optical (FSO) communication systems.

FSO communication systems are often located within communication terminals installed on satellites 104, 106 orbiting a ground (e.g., earth) 102 reference, as well as on airborne vehicles (i.e., aircrafts) and various ground-based terminals 108 (e.g., mobile or stationary). The communication systems are adapted to receive and/or transmit optical signals across free space mediums, including air mediums and/or vacuums (i.e., space). Each FSO system may include a transmitter to transmit outgoing optical signals and/or receivers to receive incoming optical signals. To this end, FSO communication links can be established between neighboring optical communication terminals to allow for exchange of data. For example, FSO links can be established between two or more satellites (i.e., inter-satellite FSO links 112a, 112b), between satellites and ground-terminals (i.e., FSO links 114a, 114b), as well as between various ground-terminals. Each FSO link can include downlinks (112a, 114a) as well as uplinks (112b, 114b).

Figure 2:
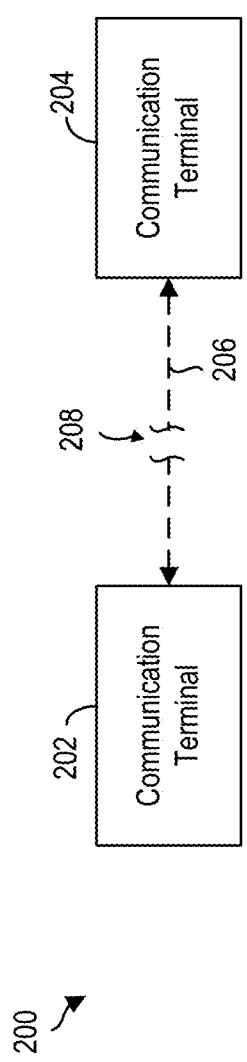
FIG. 2 shows a simplified block diagram of an example FSO communication link.

Reference is now briefly made to FIG. 2, which shows a simplified block diagram of an example arrangement 200 for free space optical (FSO) communication.

As shown, an FSO link 206 may be established between at least two optical communication terminals 202, 204, i.e., terminals installed on satellites, aircrafts or on ground. The FSO link 206 can allow data to be exchanged between these terminals 202, 204 over a free space medium 208. In some cases, a communication terminal may only transmit optical signals, receive optical signals, or otherwise both transmit and receive optical signals (i.e., a transceiver terminal).

Figure 3A:
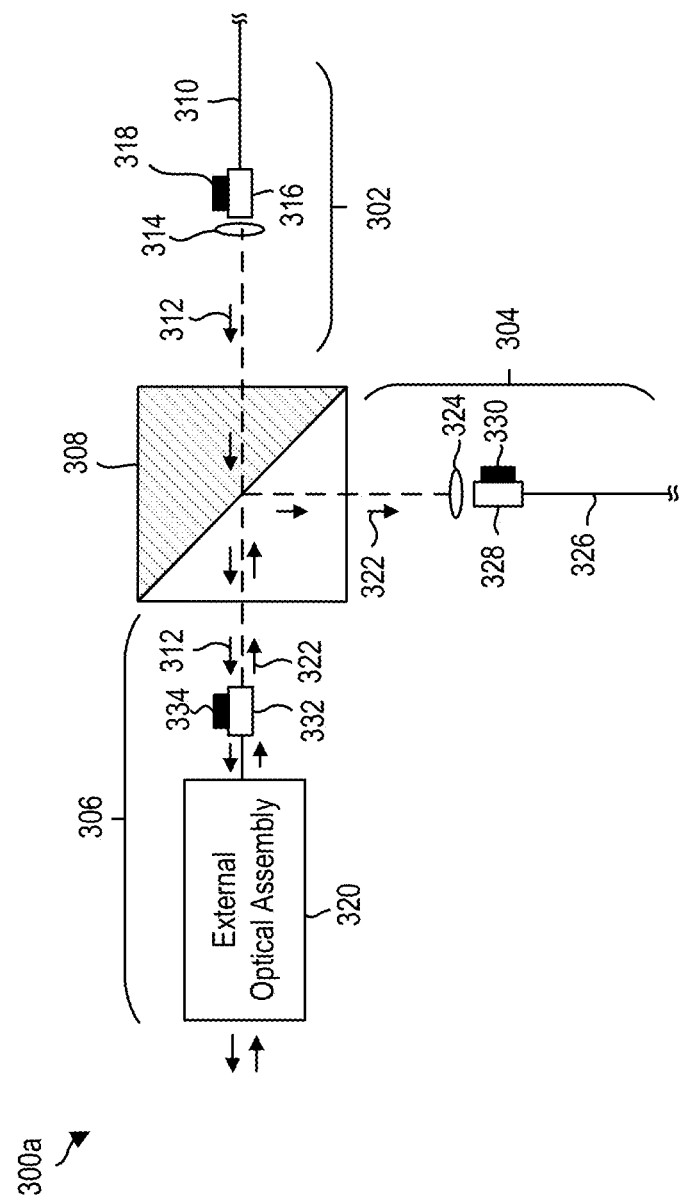
FIG. 3A shows an example conventional design for an optical communication system.

Reference is now made to FIG. 3A, which shows an example FSO communication system 300a that may be located within a communication terminal, i.e., terminals 202, 204. The system 300a is an example of a conventional design for an optical communication system which allows for both transmission and reception of optical signals.

As shown, the FSO communication system 300 may include an optical signal transmitting pathway 302, an optical signal receiving pathway 304, and an external pathway 306. Interposed between the pathways 302, 304, 306 is a beam splitter 308. In the illustrated example, the beam splitter 308 is a dichroic mirror that splits the transmitting (Tx) and receiving (Rx) pathways along a central wavelength. For example, the dichroic beam splitter can pass outgoing optical signals having a first range of wavelengths, while reflecting incoming optical signals having a second range of wavelengths. In other cases, rather than being a dichroic mirror, the beam splitter 308 can comprise a polarizing beam splitter which separates optical signals based on their polarization. In still other cases, aperture splitting or mode splitting methods can also be used to separate the transmitting pathway 302 from the receiving pathway 304.

Transmitting pathway 302 may include a first fiber optic link or cable 310 for carrying transmitted optical signals 312, i.e., generated by an upstream transmitter, such as a laser light source. The fiber optic cable 310 carries the optical signal 312, and transmits the optical signal 312, via an internal aperture 314, towards the beam splitter 308 (i.e., from an open end of the optical fiber 310). In this example, the transmitted optical signal 312 is within the first range of wavelengths that passes directly through the dichroic beam splitter 308. The transmitted signal 312 continues onwards from the beam splitter 308 to the external pathway 306. External pathway 306 includes, for example, an external optical assembly 320, which comprises various mirrors, lenses etc. that magnify the outgoing signal, as well as direct the outgoing signal along a particular direction, i.e., via a coarse pointing assembly. The transmitted signal may then continue further onwards to other external communication terminals.

In the reverse case, an incoming optical signal, i.e., received from another external communication terminal, is received along the external pathway 306 via the external optical assembly 320. From the external optical assembly 320, the signal travels towards the beam splitter 308. The received signal 322 may be within a second range of wavelengths that is reflected by the beam splitter 308 towards the receiving pathway 304, and away from the transmission pathway 302. The received signal 322 travels through the receiving pathway 322 and, via an internal aperture 324, is received into a second fiber optic cable or link 326. The fiber optic cable 326 carries the received signal towards various receiving modules (i.e., modules for signal processing and demodulation, etc.)

As illustrated, each internal aperture 314, 324 may also include a corresponding fine pointing optical assembly 316, 328, as well as an actuator 318, 330 for controlling the respective fine pointing assembly. The fine pointing assemblies 316, 328 couple to the respective fiber optic link 310, 326 and either, (i) receive outgoing optical signals therefrom (i.e., assembly 316), or (ii) transmit incoming optical signals thereto (i.e., assembly 328). The fine pointing assemblies 316, 328 may comprise, for example, fast steering mirrors, and the actuators 318, 330 may comprises motors that rotate the fast steering mirrors. In some cases, only one of the fine pointing assemblies 316, 328 and corresponding actuators 318, 330 may be provided in the system. In some example cases, a fine pointing assembly 332 (and corresponding actuator 334) may also be interposed between the beam splitter 308 and the external optical assembly 320.

The fine pointing assemblies 316, 328 may be adapted to provide fine beam steering of the corresponding optical signal. For example, this may involve jitter stabilization to maintain accurate directional beam steering notwithstanding vibrational forces. The fine pointing assemblies 316, 318 may also be used for point ahead or point behind offset corrections. Point ahead and behind offset corrections compensate for non-negligible time-of-flight considerations when the FSO system 300 communicates with an external terminal having a high relative velocity (see e.g., satellites 104, 106 in FIG. 1). For example, during transmission of optical signals, as between the time the optical signal is transmitted by the FSO system 300, and the time the optical signal is received at an external terminal—the receiving terminal may have shifted its position owing to its high relative velocity (see e.g., satellite 106 in FIG. 1 shifting positions from position "A" to "B"). Accordingly, the fine pointing assembly 316 corrects the outgoing direction of the outgoing signal to accommodate for this positional shift. In the reverse case, when an optical signal is received from an external terminal, the fine pointing assembly 328 can effect small corrective deflections to the incoming signals so as to properly route the received signal into the optical link 326.

To this end, a number of deficiencies have been appreciated in the conventional design of FSO communication systems as shown by way of example in FIG. 3A. One significant deficiency is that the conventional design requires separating the transmitting and receiving channels (i.e., transmitting channel 302 and receiving channel 304). Each separate channel includes separate fiber coupling links 310, 326, as well as separate optical systems for each link (i.e., separate fine pointing assemblies 316, 328). Accordingly, to realize the conventional design, at least twice the system components (i.e., fine pointing assemblies and fiber optic links) and control systems (i.e., for controlling actuators 318, 330) are required to accommodate each separate channel. This, in turn, increases the mass and power consumption of the communication system. In many cases, free space optic (FSO) applications (i.e., satellites) require low mass and low power consumption for effective operation.

A further appreciated deficiency is that the transmit and receive signals must have different wavelengths, or otherwise, different polarizations. This is to enable the beam splitter 308 to effectively separate between the transmit and receive channels. As such, techniques such as wavelength division multiplexing (WDM)—which allow for increased information transfer in the transmitted or received optical signals—may not operate well with the conventional system design.

In view of the foregoing, there is a desire for an optical communication system that can overcome at least some of the aforementioned deficiencies.

As provided herein, an optical communication system is used which incorporates transmission and receiving channels (or transmission and receiving pathways) into a shared, or common fiber optic assembly. The optical communication system is realized through the use of nascent photonic lantern technology. The provided optical communication system may overcome at least some of the aforementioned deficiencies of conventional FSO communication systems.

Reference is now made to FIGS. 4A-4C, which show an example photonic lantern 400. The photonic lantern 400 is an example of a photonic lantern that may be incorporated into an optical communication system in accordance with the teachings provided herein.

In general, photonic lanterns operate by adiabatically merging several single-mode fiber optic cores into a single multi-mode optic fiber core, or vice versa. Various optical lantern constructions and architectures will be known to those skilled in the art, and include photonic lanterns that use, for example, aperiodic single-mode fiber Bragg gratings (see also e.g., T. A. Birks, I. Gris-Sanchez, S. Yerolatsitis, S. G. Leon-Saval, and R. R. Thomson, "The photonic lantern," Adv. Opt. Photon. 7, 107-167 (2015), which provides a review of known photonic lantern designs).

As best shown in FIG. 4A, the conventional photonic lantern extends between a first end 402 and a distal opposed second end 404. The first end 402 includes an opening into a single multi-mode optical fiber 406 (FIG. 4B), while the second end 404 includes a plurality of openings corresponding to a plurality of single-mode optical fibers (see e.g., 408a-408h in FIG. 4C).

A mid-portion 412 extends between the first end 402 and second end 404 and adiabatically merges the single multi-mode fiber 406 to the plurality of single-mode fibers 408. More particularly, the mid-portion 412 maps various free space optical modes (e.g., gaussian, Hermite-gaussian and Laguerre-gaussian modes) entering the multi-mode fiber at the first end 402 into individualized singularized modes corresponding to each single-mode fibers 408. At least one of the single-mode fibers carries a fundamental optical mode from the multi-mode core (e.g., $HE_{11}$ or $LP_{01}$ modes, as known in the art), while the remaining single-mode fibers carry other higher order optical modes. In some cases, the single-mode fiber, carrying the fundamental mode, may be located at the radial center of the second end 404 of the lantern (e.g., 408h in FIG. 4C).

To this end, it has been appreciated herein that photonic lanterns may have a unique and novel application in designing FSO communication systems.

Figure 5A:
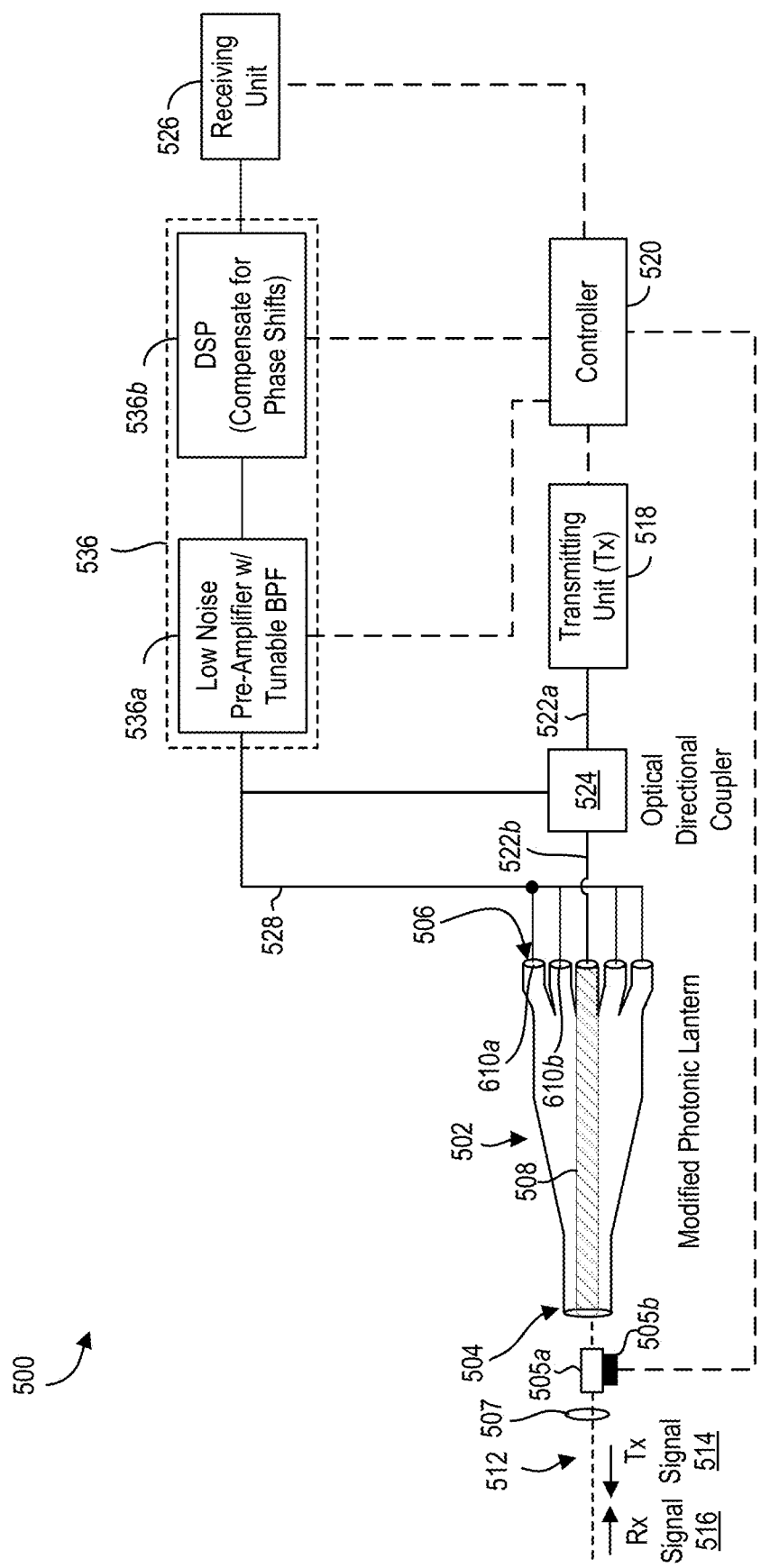
FIG. 5A shows an example optical communication system using an example modified photonic lantern.

Reference is now made to FIG. 5A, which shows an example FSO communication system 500 which incorporates a modified photonic lantern.

As shown, the system 500 includes the modified photonic lantern 502, which extends between a first photonic lantern end 504 and a second photonic lantern end 506. The modified photonic lantern 502 is generally analogous to the photonic lantern 400 of FIG. 4A, with the exception that the lantern 502 has been modified to include a central single-mode fiber 508 extending between the first and second ends 504, 506. The central single-mode fiber 508 carries a fundamental optical mode through the photonic lantern and is a separate optical fiber from the remaining photonic lantern.

Figure 6B:
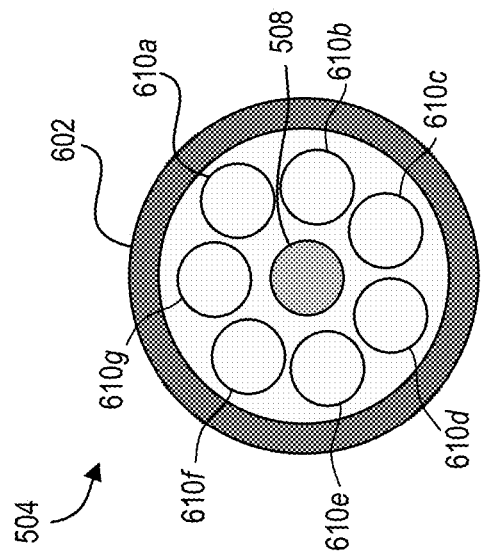
FIG. 6B shows a view of an example second end of an example modified photonic lantern.
Figure 6A:
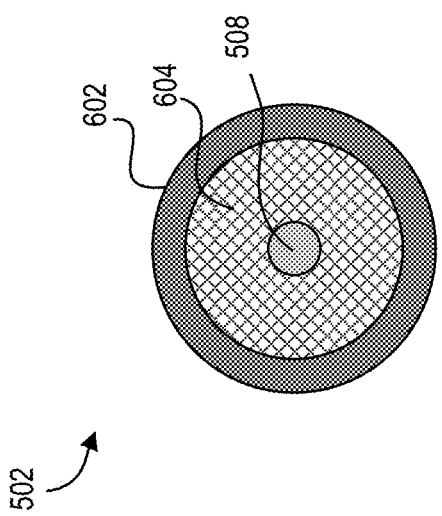
FIG. 6A shows a view of an example first end of an example modified photonic lantern.

To better clarify the modification to the photonic lantern 502, FIG. 6A shows a view of the first end 502 of the modified photonic lantern 502. As illustrated, the first end 502 may include the outer cladding 602, as well as an opening for a single multi-mode fiber core 604. The first end 502 also includes an opening into the central single-mode fiber 508 which is positioned (i.e., nested) in the radial center of the circular multi-mode fiber core. FIG. 6B shows a view of the second end 504 of the modified photonic lantern 502. The second end 504 includes openings for a plurality of single-mode fibers 610a-610g, which are adiabatically coupled to the multi-mode fiber 604 at the first end 502. The second end 504 also includes an opening to the central single-mode fiber 508.

As shown, at the second end 502, the central single-mode fiber 508 may replace the single-mode fiber that ordinarily carries the fundamental mode in the conventional lantern (i.e., 408h in FIG. 4C). That is, the single-mode fiber, normally carrying the fundamental mode, may be removed to accommodate the central single-mode fiber 508 that is extending between the first end 502 and the second end 506. The modified photonic lantern 502 therefore comprises the central single mode-fiber 508 surrounded by a structure corresponding to an otherwise conventional photonic lantern structure but with the fundamental single-mode fiber being removed to accommodate central fiber 508. In some example cases, the first end 502 may have a multi-mode core that can carry 20 to 25 different optical modes, and the second end 504 may include 20 to 25 single-mode fibers 610 that map to each mode. The operation of the modified photonic lantern 502 within the optical system 500 is clarified in greater detail herein.

Continuing with reference to FIG. 5A, the first end 504 of the photonic lantern 502 may be coupled to an external communication path 512. The external communication path 512 may be analogous to the external pathway 306 in FIG. 3A and may include, for example, an external optical assembly (not shown). The external optical assembly may be similar to the assembly 320 and may be used to communicate with other optical communication terminals (i.e., located on other satellites).

In some examples, a fine pointing assembly 505a and a corresponding actuator 505b may be interposed between the first end 504 of the lantern 502 and the external communication path 512. The fine pointing assembly 505a may receive or transmit optical signals via an internal aperture 507. The actuator 505b may be controlled, for example, by a controller 520.

Figure 5B:
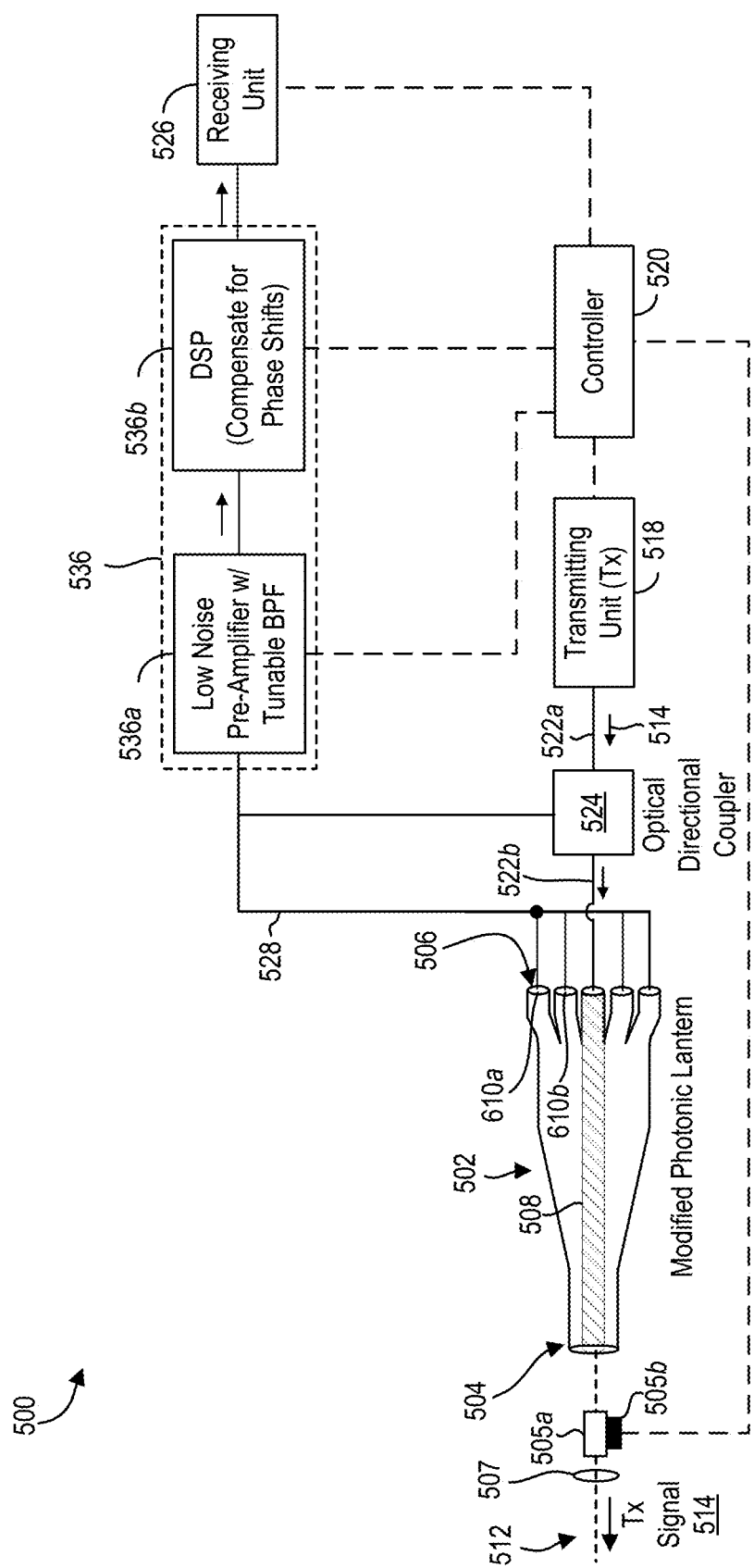
FIG. 5B shows the optical communication system of FIG. 5A in an example case where an optical signal is transmitted.
Figure 5C:
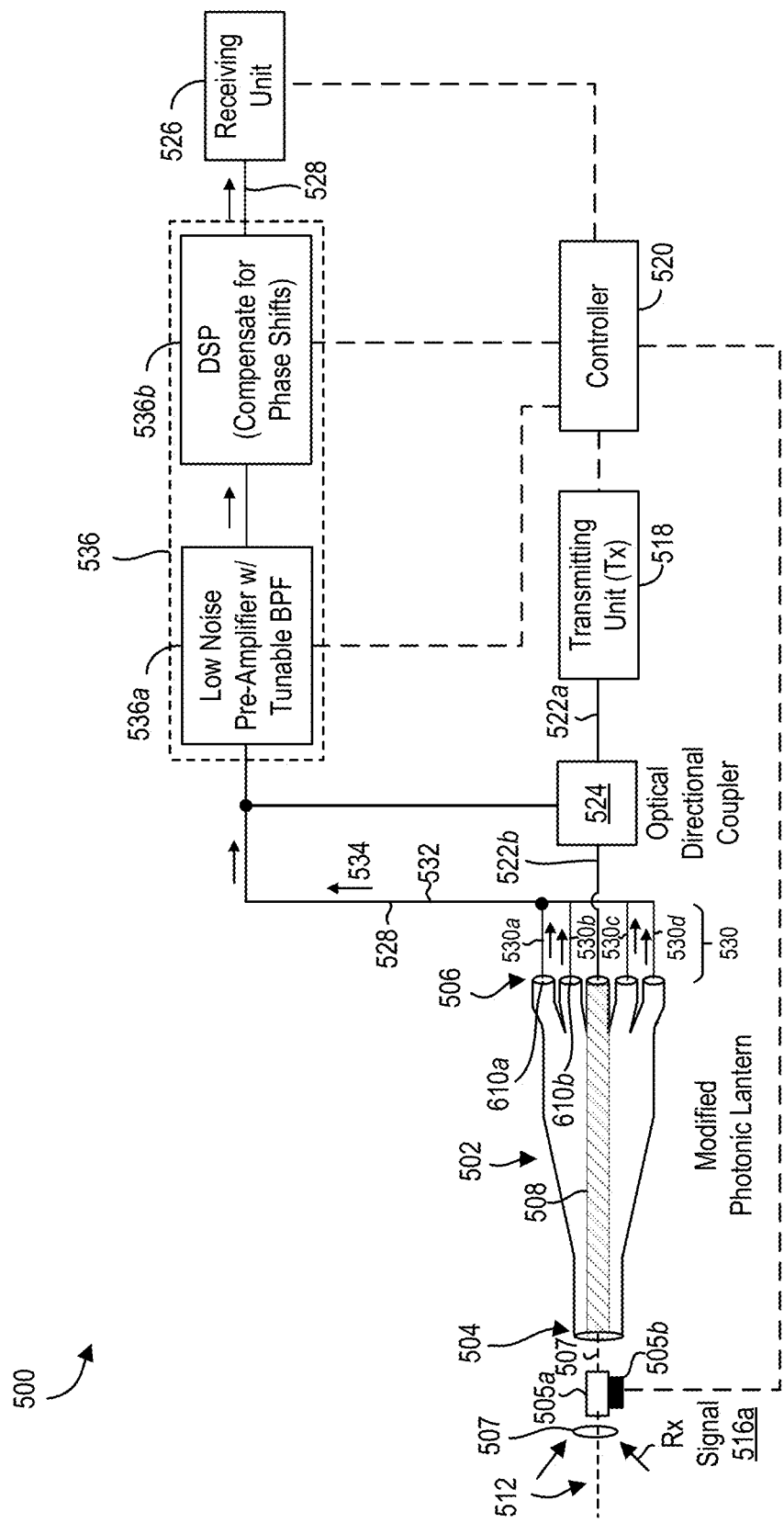
FIG. 5C shows the optical communication system of FIG. 5A in an example case where an optical signal is received off-axis.
Figure 5D:
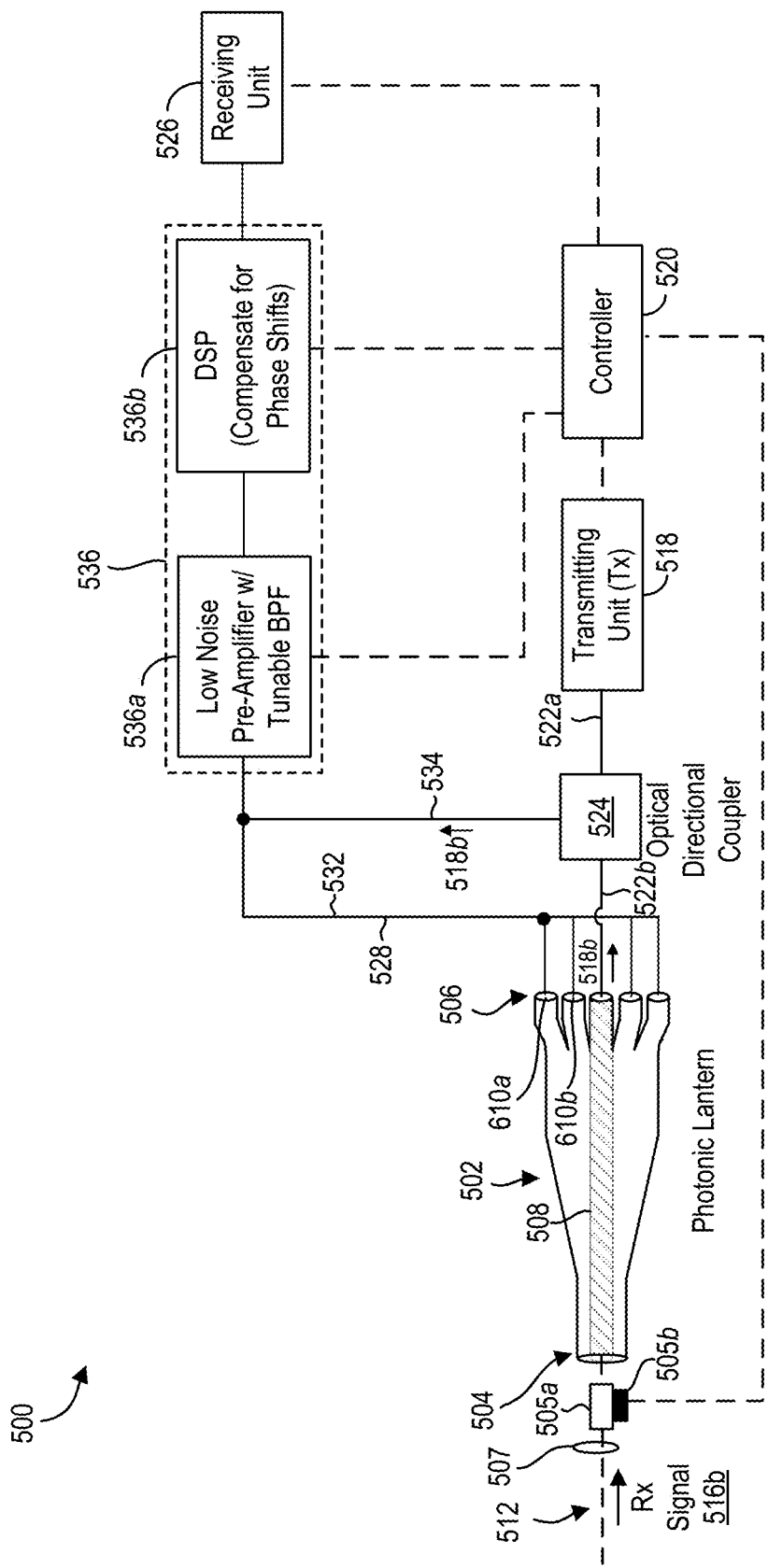
FIG. 5D shows the optical communication system of FIG. 5A in an example case where an optical signal is received on-axis.

The remainder of the optical system 500 is now explained in greater detail with reference to FIGS. 5B-5D. FIG. 5B illustrates an example case where optical signals are transmitted through the optical system 500, while FIGS. 5C and 5D illustrate example cases where optical signals are received through the optical system 500. For ease of description, not all elements of the optical system 500 as shown in FIG. 5A are reproduced in each of FIGS. 5B-5D, however it will be appreciated that these elements may still be included in the optical system.

Reference is now made to FIG. 5B, which shows an example where the optical communication system 500 is used for transmitting optical signals.

As shown, the optical system 500 may include a transmitting unit 518. Transmitting unit 518 can convert outgoing signals from an alternate communication and/or processing format (e.g. Ethernet) into optical signals carrying data. The transmission unit 518 can be configured to modulate outgoing signals for transmission as an optical laser signal along a signal transmission path 522. For example, in some cases, the transmission unit 518 may include a laser light source. In some cases, the transmission unit 518 may include an external or integrated optical modulator such as an electro-absorption modulator (EAM) or a Lithium Niobate Mach Zehnder external modulator for example.

The optical modulator may be operable to modulate the laser light source to generate an outgoing optical laser signal which is transmitted along the signal transmission path 522 to the photonic lantern 502. For example, the light source may be modulated such as by phase modulating the carrier optical signal (e.g., the laser beam) such that a modulated transmitted optical signal is generated which includes a sequence of multi-photon pulses with varying phase shifts, each phase shift corresponding to a unique data symbol (e.g., one more bits of information).

In various cases, the amplitude of the carrier signal can also be varied, i.e., in addition to the phase, to encode a wider array of data. Examples of phase modulation schemes, and related variants, include n-PSK (phase-shift key) modulation, quadrature phase shift keying (QPSK), dual-polarization quadrature phase shift keying (DP-QPSK), offset phase shift keying (OPSK) modulation and n-QAM (quadrature amplitude modulation).

In at least one example case, the transmitting unit 518 is coupled (i.e., electrically coupled) to the controller 520, which can include a processor with executable instructions that can control operation of the transmitting unit 518 (i.e., controlling time of transmission, data to be modulated into carrier signal, etc.).

Optical signals 514, generated by the transmitting unit 518, may travel in an outward direction along the signal transmission path 522. The signal transmission path 522 may extend between the transmitting unit 518 and the opening of the central optic fiber 508 at the second photonic lantern end 506. In at least some cases, the signal transmission path 522 may comprise an optical fiber cable or link. As used herein, the outward direction (i.e., outward signal direction) may refer to a direction that includes a signal travel path that includes signals travelling from the second end 506 of the lantern to the first end 504 of the lantern, while an inward direction (i.e., inward signal direction) may refer to a direction which includes a signal travel path extending from the first end 504 to the second end 506 of the lantern 502.

Travelling in the outward direction, the optical signal can travel through the signal transmission path 522 and onwards through the photonic lantern 502, via the central fiber 508, i.e., travelling from the second end 506 to the first end 504 of the modified photonic lantern 502. To this end, in order to travel within the central fiber 508, the optical signal generated by the transmitting unit 518, may be of a fundamental optical mode (i.e., the transmitting unit 518 may generate the carrier optical signal having the fundamental mode that is adapted to travel through the central fiber 508). Once the transmitted optical signal 514 exits the central fiber 508 at the first lantern end 504, the optical signal 512 may continue along the external signal path 512. In the illustrated example, the first end 504 of the lantern 502 may be an open end. In at least some example cases, the transmitted signal may exit the single-mode fiber 508 and may be directed by the fine pointing assembly 505a to eliminate local jitter from the beam and apply the appropriate point-ahead angle to direct the beam to a receiver terminal, e.g., with a high relative transverse velocity.

As illustrated, the signal transmission path 522 may be interposed by an optical directional coupler 524. The optical directional coupler 524 segments the signal transmission path 522 into a first transmission path portion 522a and a second transmission path portion 522b. The first portion 522a extends between the transmitting unit 518 and the optical directional coupler 524, while the second portion 522b extends between the optical directional coupler 524 and the opening of the central fiber 508 at the second lantern end 506. The operation of the optical directional coupler 524 is explained in greater detail herein with reference to FIGS. 5E and 5F.

Reference is now made to FIGS. 5C and 5D, which show the optical communication system 500 being used for receiving optical signals. FIG. 5C illustrates an example case where optical signals are received off-axis, while FIG. 5D illustrates an example case where optical signals are received on-axis.

Reference is initially made to FIG. 5C, which shows the optical communication system 500 receiving off-axis optical signals.

As shown, received optical signals 516a may be received off-axis due to a non-zero tangential differential velocity between communicating terminals. That is, the received optical signal may be received by an offset angle corresponding to the point ahead or point behind angle as between the transmitting optical terminal and the receiving optical terminal. When a signal is received off-axis, it has been appreciated that the offset may appear (i.e., manifest) as an optical mode offset in the received optical signal. In other words, the angled reception of the optical beam may "distort" the optical beam at the receiving optical terminal such that the received optical signal is now characterized by one or more higher order optical modes that exclude the fundamental optical mode. In FIG. 5C, the reception of off-axis optical signals is expressed by arrows that are angled away from a central axis 507 that runs through a radial center (or otherwise, a center point) of the first end 504 of the photonic lantern 502 (i.e., corresponding to the location of the central fiber 508). To this end, system 500 may include focusing optics to focus the off-axis optical signal. The focusing optics may, for example, form part of the component assembly 505, or otherwise provided externally.

Accordingly, as the received optical signal comprises one or more higher optical modes, and is focused onto the fiber by the focusing optics in assembly 505a, the signal 516a may not enter the photonic lantern 502 through the central fiber 508 (i.e., corresponding to a fundamental mode), i.e., the optical signal not carried by the central fiber 508. Rather, the received optical signal is received through (or otherwise carried by) the surrounding multi-mode fiber core (604 in FIG. 6A). In this manner, the design of the modified photonic lantern 502 allows the received higher-order mode off-axis optical signal 516a to be diverted away from the transmitting unit 518, which is coupled to the central fiber 508. The modified photonic lantern 502 then adiabatically couples the received multi-mode optical signal (also referred to herein as a received higher-order mode optical signal), such that as the signal travels in the inward direction, and the various constituent signal modes exit the photonic lantern 506 at the second end 506, and via the one or more corresponding single-mode optical fibers (i.e., 610 in FIG. 6B). Here it will be understood that the each of the single-mode received optical signals, carried by each single-mode fiber 610, can map to one of the modes in the received multi-mode optical signal.

At the second end 506 of the lantern 502, the single-mode fibers 610 may each be coupled to a signal receiving path 528. The signal receiving path 528 may comprise, for example, one or more fiber optic links or cables that couple each of the single-mode fibers 610 to a receiving unit 526 (i.e., coupled to the openings of the single-mode fibers 610).

In the illustrated example, the optical receiving path 528 may include a first receiving path portion 530 and a second receiving path portion 532. The first portion 530 may include multiple paths, i.e., 530a-530n that connect to each respective opening of each single-mode fiber 610 (also referred to herein as mode-specific receiving paths 530, or simply mode-specific paths). Each mode-specific path 530 receives a corresponding single-mode optical signal from the respective single-mode fiber 610. The plurality of mode-specific paths 530 may then be combined into a single receiving path 532. In at least one example case, the mode-specific paths 530 may be passively spliced together to combine into the single path portion 532 adapted to carry a single optical signal mode. It will be understood by those skilled in the art that coupling fibers together in this manner without control of optical phase, will introduce optical losses due to destructive interference between signals, however in some cases this loss penalty may be deemed acceptable. For example, this may occur by way of known splicing techniques, such as via mechanical splicing or fusion splicing of optical links or cables corresponding to each of the mode-specific paths 530. The received signal, that travels through the path portion 532, may be referred to herein as a combined received single-mode optical signal. The combined received single-mode optical signal may then travel through the path 532, and onwards toward the receiving unit 526.

Receiving unit 526 can convert incoming the combined received single-mode optical signal into an alternate communication and/or processing format (e.g. Ethernet). The receiving unit 526 can be configured to demodulate incoming optical laser signal(s) received through signal reception path 528. In at least one example case the receiving unit 526 may be coupled to a controller 520, which can control the operation of the receiving unit 526. In some cases, the receiving unit 526 can include a heterodyne IQ (in-phase, and quadrature) demodulator photonic integrated circuit. The heterodyne IQ demodulator may include an amplified photodiode signal transducer and a local heterodyne laser source.

The optical system 500 may also include a signal processing unit 536. The signal processing unit 536 may be interposed along the signal reception path 528 (i.e., along the second reception path portion 532). The signal processing unit 536 can include one or more hardware sub-units for performing, for example, filtering, amplification, as well as for correcting for various time-varying and transmission-related errors in the received signal (i.e., to allow for proper decoding and/or demodulating of signal data).

In the illustrated example, the signal processing unit 536 can include a first sub-unit 536a for low noise pre-amplification and applying a tunable bandpass filter. In some cases, sub-units 536a may not include a tunable bandpass filter, which may be the case where the receiving unit 526 is a heterodyne receiver. The signal processing unit 536 may also include a second sub-unit 536b which performs digital signal processing (DSP) to compensate for phase shifts. In some cases, the DSP may comprise an electronic chip attached to the output of the optical receiving unit 526. The signal processing unit 536 may be implemented using any known method known in the art. In some example cases, one or more components of the signal processing unit 536 may be coupled to the controller 520, such that the controller 520 can control operation and functioning of the unit 536.

Phase offsets between the receiving single-mode fibers 610 may be compensated either actively or passively to minimize destructive interference between captured modes (see e.g., techniques as discussed in A. Belmonte and J. Kahn, "Field Conjugation Adaptive Arrays in Free-Space Coherent Laser Communications," in IEEE/OSA Journal of Optical Communications and Networking, vol. 3, no. 11, pp. 830-838, November 2011, doi: 10.1364/JOCN.3.000830). It also been appreciated that, in some cases, wavefront tilts in the incoming beam due to off-axis receive angles are likely to couple asymmetrically, resulting in a majority of the optical amplitude being captured by a single lantern output, thus limiting destructive interference losses.

Reference is now made to FIG. 5D, which shows the optical communication system 500, and illustrates an on-axis signal being received.

In cases where an optical signal is not received with point ahead or point behind offsets, the optical signal 516*b* may be received on-axis. The on-axis signal is typically comprised of a single fundamental mode, and is therefore received back into the central fiber 508 via the first end 504 of the photonic lantern 502. It will be appreciated that the positioning of the central fiber 508 in the radial center of the first lantern end 504 is to facilitate reception of on-axis signals (e.g., the axis 507). The received optical signal 516*b* propagates in the inward direction through the central fiber 508 and exits the modified photonic lantern 502 at the second end 506.

To prevent the received signal 518*b* from interfering with transmitting unit 518, the optical directional coupler 524 can be positioned to re-route the received signal 518*b* away from the transmitting unit 518, and back onto the signal recipient path 528 (i.e., directly, or via an intermediate signal path portion 534 comprising, for example, a fiber optic link). Accordingly, the optical directional coupler 524 can accommodate the unique case where the signal is not received off-axis. The optical directional coupler 524 is now explained in greater detail herein with reference to FIG. 5E and FIG. 5F.

Figure 5E:
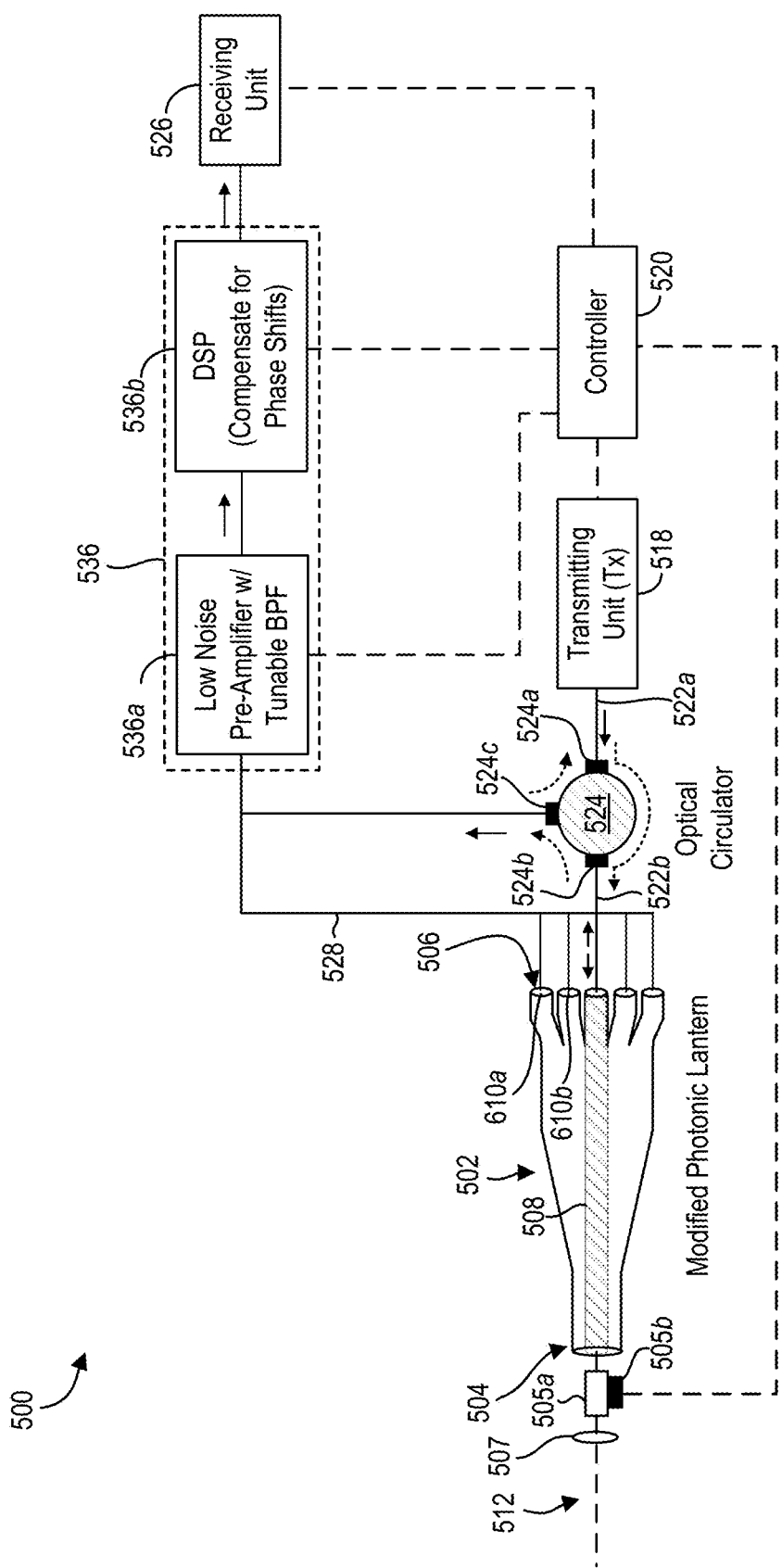
FIG. 5E shows another example of the optical communication system of FIG. 5A.

FIG. 5E illustrates the optical system 500, and illustrates an example of the optical directional coupler 524. In this example, the optical directional coupler 524 comprises an optical circulator 524. As shown, the optical circulator 524 can include a number of ports 524*a*, 524*b*, 524*c*: (i) port 524*a* may be coupled to the transmitting unit 518 via the first signal transmission path portion 522*a*, (ii) port 524*b* may be coupled to the opening of the central single-mode fiber 508 at the second end of the lantern 502 via the second signal transmission path portion 522*b*, and (iii) port 524*c* may be coupled to the receiving unit 526 via the receiving path 528 (i.e., port 524*c* may couple to the receiving path 528 either directly, or via the intermediate path portion 534 which can be passively spliced into the receiving path 528).

Within the optical circulator 524, first port 524*a* may be internally coupled to the second port 524*b* such that transmitted signals, i.e., from the transmitting unit 518, are forwarded toward the central fiber 508 coupled to the second transmission path portion 522*b*. The second port 524*b* is further internally coupled to the third port 524*c* such that incoming on-axis received signals, i.e., from the central fiber (FIG. 5D), are routed to the signal receiving path 528, and away from the transmitting unit 528.

Figure 5F:
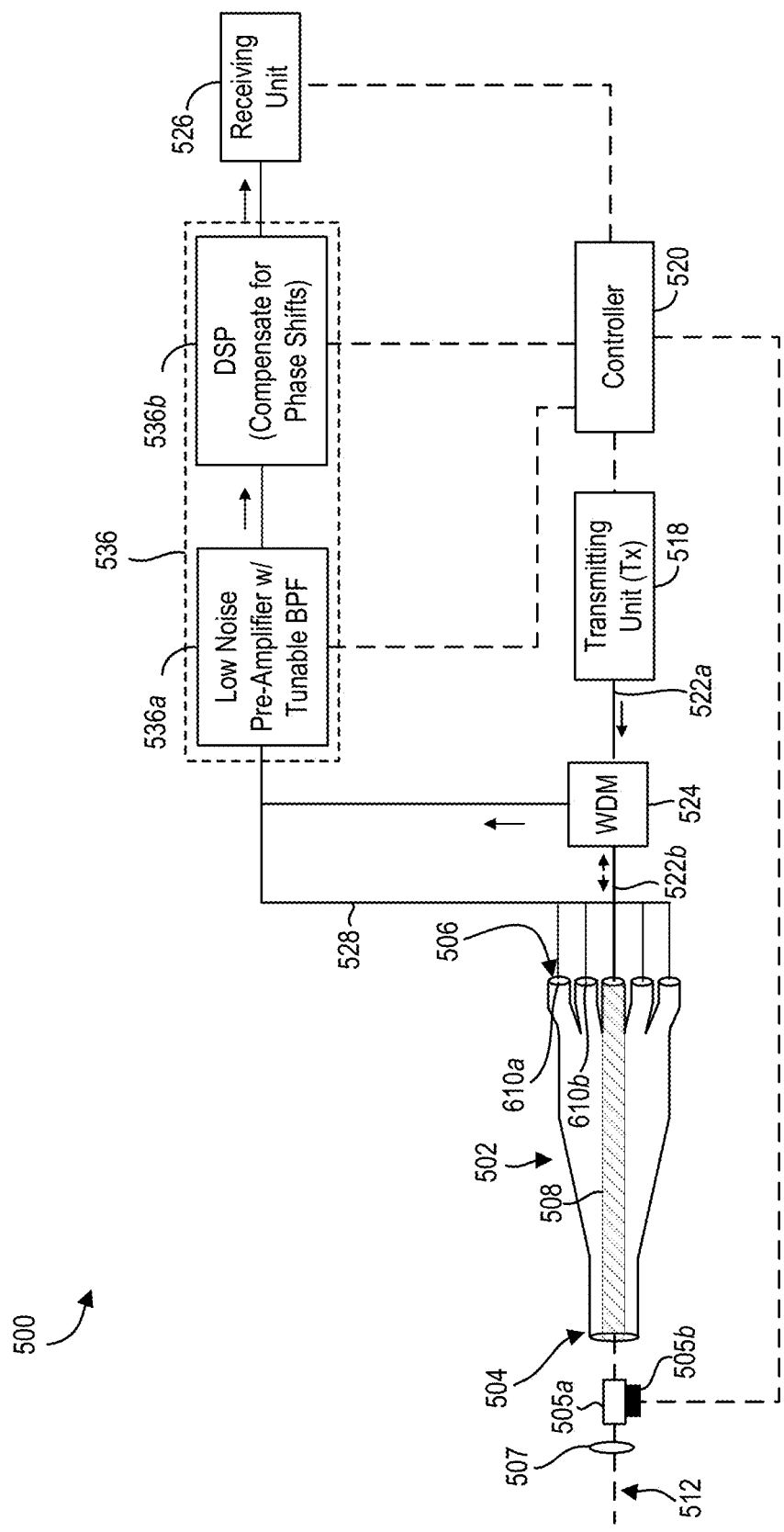
FIG. 5F shows the optical communication system of FIG. 5A.

FIG. 5F illustrates another example of the optical system 500. In this example, the optical directional coupler 524 comprises a wave division multiplexer (WDM). The WDM 524 is used to transmit (i.e., filter) signals emitted from the transmitting unit 518 at a first range of wavelengths, and to pass the signals from the first transmit path portion 522*a* to the second transmit path portion 522*b*, and towards the central fiber 508 (i.e., signals travelling in an outward direction). The WDM 524 can also be used to route received on-axis signals having a second wavelength range, along the signal receiving path 528, i.e., to pass these signals—travelling in the inward direction—from the second signal transmit path portion 522*b* towards the signal receiving path 528.

In will now be understood that the optical directional coupler is adapted to, (i) couple the second signal transmitting path portion 522*b* to the signal receiving path 532 in the case of received optical signals travelling in the inward direction, and further (ii) couple the first signal transmitting path portion 522*a* to the second signal transmitting path portion 522*b* in the case of transmitted signals travelling in the outward direction. Accordingly, the optical directional coupler is so-named for its function in coupling signals travelling in two opposite directions to two different signal paths. Further, it will be understood that the use of optical circulators and WDMs are only two non-limiting examples of devices or mechanisms that can act as optical directional couplers, and that the optical system 500 can include any other suitable device or mechanism that can similarly act as an optical directional coupler.

In view of the above, it will be appreciated that the use of the modified photonic lantern 502 in the FSO system 500 enables incorporating both the transmission and receiving channels into the same fiber optic assembly, i.e., comprising the modified photonic lantern. Accordingly, the transmit and receive channels can share, for example, a single fine steering assembly (i.e., 505 in FIG. 5A), thereby eliminating the dual controls for separate fine steering assemblies as shown in the conventional design in FIG. 3A. This, in turn, can allow the optical communication terminal to have a simpler design with lower mass and power consumption.

It will be further appreciated that, owing to the large multi-mode core at the first end 504 of the modified photonic lantern 502, the lantern 502 is suited for communication terminals that receive over a large array of angles (i.e., owing to point ahead or point behind offsets), thereby allowing the FSO communication system 500 to have a large field of view. The multi-modes received at the first end 504 are then converted into a plurality of single-mode inputs, and via passive splicing, and are combined into one single-mode input. As explained above, the use of the optical directional coupler in association with a single central mode fiber that carries only a fundamental mode mitigates cases where an optical signal is received on-axis (FIG. 5D).

Reference is now made to FIGS. 7A and 7B, which shows an optical communication system 700. The system 700 is generally analogous to the system 500, with the exception that a conventional (i.e., non-modified) photonic lantern 400 is used. For ease of description, not all components of the optical communication system 700 are illustrated (i.e., the fine steering assembly 505, receiving unit 526, transmitting unit 518, controller 520, and signal processing module 536)—however, it will be understood that these components may be incorporated into the system 700 in an analogous manner as shown in system 500.

In the illustrated example, the photonic lantern 400 can not only be placed at a focus, as per the previous iteration, but it could also be placed in aperture space such that optical signals from different directions are collimated (i.e., by a collimator 702) prior to entering the first end 402 of the photonic lantern 400. During reception of optical signals (FIG. 7A), the collimator 702 ensures that light from different directions fill the entire internal aperture 704, located at the first end 402 of the lantern 400.

Received optical signals that are off-axis will include multiple higher-order optical modes and will exit the photonic lantern from the second end 404 from one or more of the single mode fibers 408 that carry the higher-optical modes (e.g., 408a-408g in FIG. 4C) (also referred to herein as higher-order mode fibers, or higher-order mode single-mode fibers). Received optical signals that are on-axis will include a fundamental mode that will propagate from the first end 402 to the second end 404, and exit the single mode fiber that carries the fundamental mode (i.e., single mode fiber 408h in FIG. 4C) (also referred to herein as a fundamental mode fiber, or fundamental mode single-mode fiber). In this example, the single mode fiber 408c, which carries the fundamental mode, is coupled to the receiving-transmission pathway portion 522b. In other cases, photonic lantern 400 may not be a mode-sensitive photonic lantern, but may be a generic photonic lantern, and each Gaussian free space mode may couple to an arbitrary linear combination of output SMF modes.

In the reverse case, transmitted optical signals travel through the transmission pathway 522, and into the single-mode fiber (i.e., single-mode fiber 408h) that is coupled to the transmission path 522 and which carries the fundamental mode. In this example, as there is no central single-mode fiber as shown in the photonic lantern 502, the transmitted optical signal exits from the multi-mode fiber at first end 402 of the lantern 400. As a result, the transmitted optical signal emits across the full aperture 704, and is directed towards the collimator 702.

While not shown, the optical system 700 may also include other optical components and systems (i.e., other lenses, or a fine pointing assembly) rearward of the collimator 702 (i.e., in the outward direction), including the fine pointing assembly. For example, the collimator 702 may be interposed between the first end 402 of the photonic lantern 400 and a fine-pointing assembly 505a with an actuator 505b (not shown in FIG. 7).

It will now be appreciated that the systems of FIGS. 5 and 7 are joined by the common novel concept of using a photonic lantern as a common optic fiber link to receive and transmit signals, thereby precluding the need to use separate transmit and receive optical fiber pathways as between the transmitter/receiver and the external optical signal path (as well as fine pointing assembly) The system of FIG. 5 modifies the photonic lantern to accommodate a single-mode fiber for the fundamental mode that extends between the two lantern ends, while the system of FIG. 7 allows the use of a conventional lantern. In each case, the use of a photonic lantern is used, and positioned between an external signal path, a receiving signal path and a transmitting signal path.

Figure 3B:
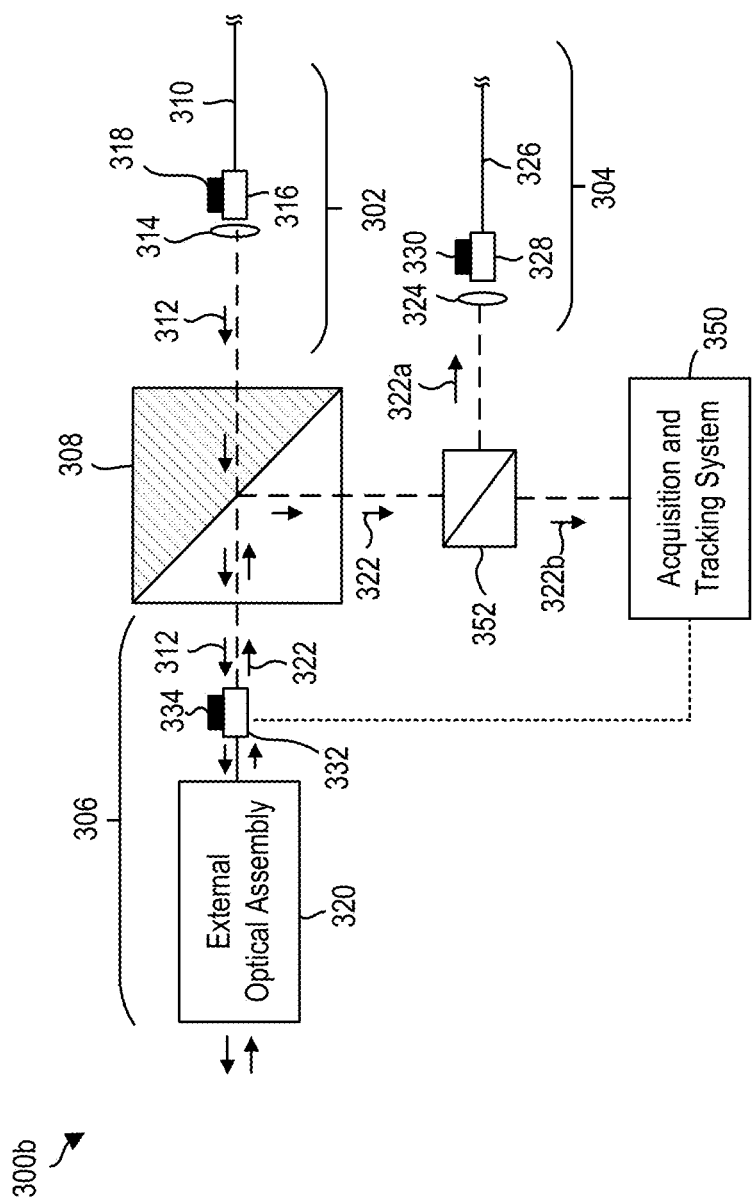
FIG. 3B shows another example conventional design for an optical communication system.

Reference is now made to FIG. 3B, which shows another example of a conventional design for an optical communication system 300b.

Communication system 300b is analogous to communication system 300a, with the exception that system 300b now includes an acquisition and tracking system 350. Acquisition and tracking system 350 may include, for example, an Acquisition and Tracking Sensor (ATS) comprising position-sensitive detectors/cameras, which are used for position and jitter sensing of the received signal 322.

As is generally known in the art, the acquisition and tracking system 350 is used for controlling the fine point assembly 332, and corresponding actuator 334, in closed-loop fashion to enable precision pointing and stabilization between the communication terminal and other communication terminals. In many cases, this allows for effective point-ahead angle (PAA) correction between communicating terminals by tracking the received signal to an off-center position via the ATS.

To this end, as illustrated, in order to accommodate the tracking system 350, a secondary beam splitter 352 is positioned between the receiving pathway 304 and the primary beam splitter 308. Beam splitter 352 may receive the received signal 322, and may divert a portion of the received signal 322b away from the receiving pathway 304 and towards the tracking system 350. The remaining portion of the received signal 322a may continue onwards to the receiving pathway 304. In some example cases, the beam splitter 352 may comprise a 90:10 beam splitter such that 90% of the received signal 322 is directed towards the receiving pathway 304 (i.e., 322a), while 10% of the received signal 322 is directed towards the tracking system 350 (i.e., 322b).

While communication system 300b illustrates a simplified example using only a single beam splitter 352, more complex architectures may include various beam splitters, lenses and/or mirrors to effect the re-direction.

It has been recognized, however, that a drawback of the conventional design 300b is the required number of precise, low wavefront-error optical components necessary for fine point tracking by the system 350. For example, infrared position-sensitive detectors (i.e., in the ATS)—e.g., which operate in the 1550 nm wavelength band—are costly, and aligning them properly so that their reflected image is coincident with a single mode receiving fiber for high speed coherent communication often requires dedicated assembly and testing time.

Here, it has been appreciated that there is a further novel application for photonic lanterns in eliminating the additional optical and electronic hardware components needed for conventional fine point tracking systems. For example, use of the photonic lantern may eliminate at least the fine tracking sensor camera in the system 350, as well as the associated beam splitter 352. As provided herein, this may be realized by monitoring the intensities of received single mode signal outputs from the photonic lantern's single mode fibers (SMFs), and applying a non-linear computational method, which may infer fine pointing error from the distribution of single mode light intensities.

Figure 8A:
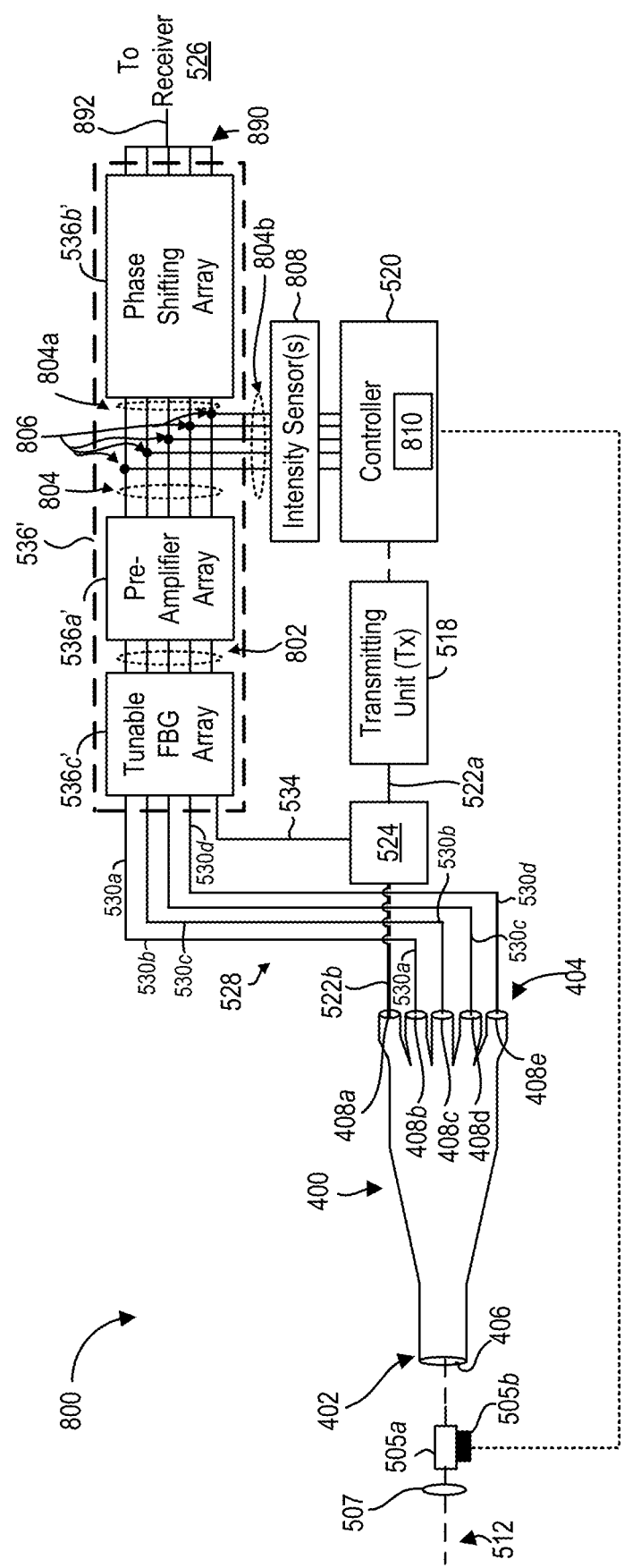
FIG. 8A shows an example optical communication system using a photonic lantern for fine point tracking.

Reference is now made to FIG. 8A, which show an example optical communication system 800 which uses a photonic lantern for fine point tracking. Concurrent reference is also made to FIG. 8B, which illustrates operation of the communication system 800 when optical signals are received.

As shown, the system 800 includes the photonic lantern 400 having the first end 402—comprising the single multi-mode fiber (MMF) 406—coupled to the external communication path 512. As described previously, the external path 512 may include fine pointing assembly 505a and a corresponding actuator/driver 505b. The second end 404, of the photonic lantern 400, includes a plurality of openings 408a-408e corresponding to a plurality of single-mode fibers (SMFs). While only five SMFs are exemplified, it will be understood that the second end 404 may include any desired number of SMF openings.

In the illustrated example, the SMF opening 408a corresponds to the fundamental mode, and is coupled to the optical directional coupler 524, i.e., via second transmission path portion 522b. In other cases, the photonic lantern 400 may be configured such that any other SMF opening corresponds to the fundamental mode. In at least some example cases, optical directional coupler 524 may comprise a high-power optical circulator, e.g., an optical circulator having greater than 30 dB isolation (see e.g., FIG. 5E).

As previously described, the optical directional coupler 524 routes incoming on-axis received signals from SMF 408a directly to the signal processing unit (SPU) 536' (i.e., via the intermediate receiving portion 534), and further routes transmitted signals from transmitting unit 518 to the SMF 408a. As the transmitted signals are coupled only to the fundamental mode SMF 408a, the photonic lantern 400 may also be referred to herein as a mode-specific photonic lantern.

As further shown, the remaining SMF openings 408b—408e (i.e., receiving off-axis signals), couple directly to the signal processing unit (SPU) 536' via corresponding receiving path portions 530a-530d. It will now be appreciated that, in contrast to the previously illustrated systems—in this system, the multiple receiving path portions 530b-530d are not combined together (i.e., passively spliced) into a single mode receiving fiber prior to feeding into the SPU 536' (e.g., path portion 532). Rather, each path portion 530a-530d, 534 feeds directly and separately into the SPU 536'. As explained herein, this is to enable functional operation of the communication system 800.

While not explicitly illustrated, it will be understood that in other example cases, the system 800 may also use the modified photonic lantern 502 (FIG. 5A).

Turning now to the signal processing unit (SPU) 536', the SPU in FIG. 8 comprises various sub-components including a tunable Fiber Bragg Grating (FBG) sensor array 536c', a signal pre-amplifier array 536a' and a phase shifting array unit 536b'.

Figure 8B:
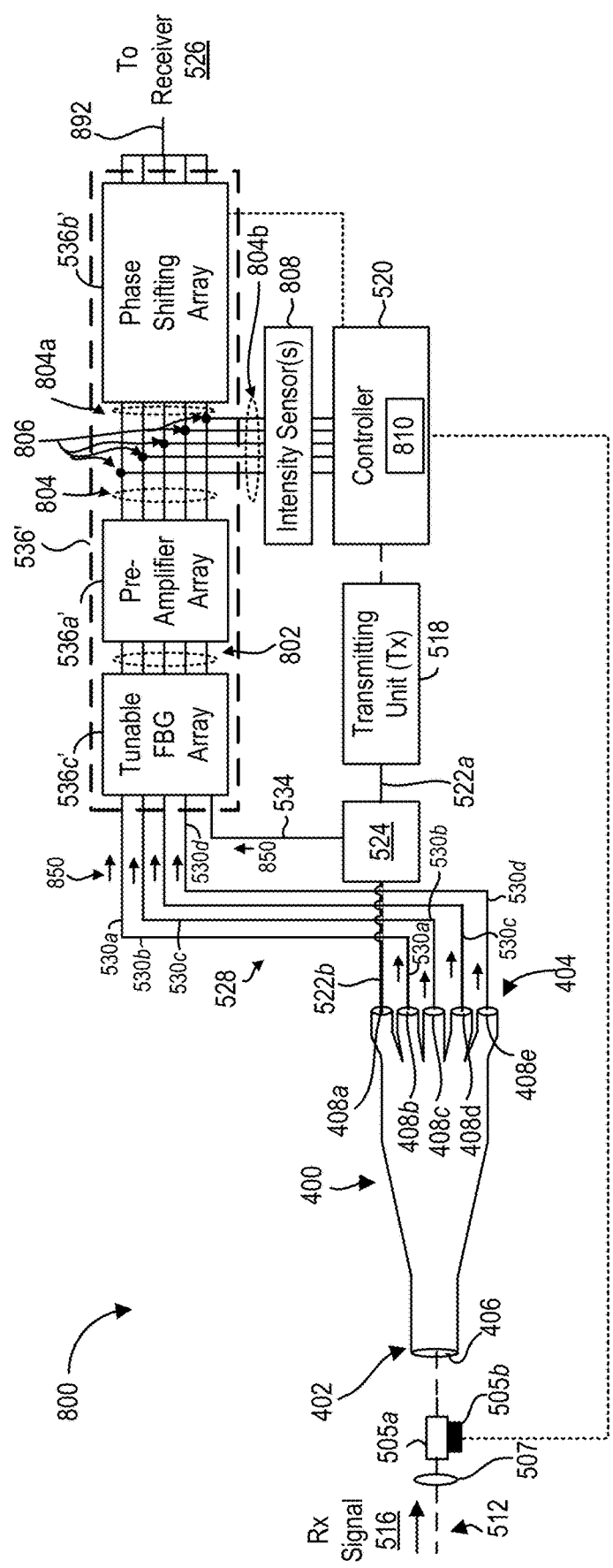
FIG. 8B shows operation communication system of FIG. 8A where optical signals are received.

As shown in FIG. 8B, in the process of receiving an on-axis or off-axis signal 516, FBG sensor array 536c' receives either a single mode signal 850 from connection 534, or multiple single mode signals 850 from each SMF 408b-408e (i.e., via the respective signal path portions 530). In various cases, the tunable FBG array 536c' is used for filtering the range of wavelengths reaching the intensity sensors 808 such as to strictly pass a small wavelength range around the received wavelength. This, in turn, eliminates back-reflection and self-blinding from the strong outgoing transmitted beam. In other cases, rather than a tunable FBG array, element 536' may be, more broadly, any type of in-line fiber wavelength filter.

The signal(s) 850 are then individually passed, via connections 802, to the pre-amplifier array 536a'. Pre-amplifier array 536a' applies low noise amplification to each signal individually. The pre-amplifier array 536a' then generates corresponding amplified single mode signals 850, corresponding to each signal mode. The amplified signal(s) 850 are further passed through the phase shifting array unit 536b', via individual connections 804.

To this end, as between the preamplifier array 536a' and the phase shifting array 536b'—there may be a plurality of signal splitters 806 (also referred to herein interchangeably as fiber splitters 806) for each connection 804. The signal splitters 806 may direct a portion of each amplified signal to an intensity sensor array 808. That is, the signal splitters 806 cause a portion of each signal 850 to be directed away from the phase shifting array 536b' towards the intensity sensor array 808 (i.e., via "arm" connections 804b). In some cases, this may be performed by sampling a fraction of the received signal in each single mode fiber (e.g., 1%-15% sampling). The remaining portions of each signal 850 may continue along "arm" connections 804a to the phase shifting array 536b'.

The intensity sensor array 808 is configured to measure and monitor the intensity (i.e., power intensity) of each single mode signal. In at least one example case, the sensor array 808 may comprise an array of monitoring photodiodes. The sensor array 808 generates electrical signals corresponding to intensity monitoring data, for each single mode signal (also referred to herein as fiber-specific intensity data or mode-specific intensity data).

As further shown, controller 520 is connected to the sensor array 808 to receive the intensity monitoring data, for each signal mode. Controller 520 hosts and executes a trained deep learning model 810 which automatically determines a non-linear relationship between (1) the intensities of each single mode signal as well as, in some example cases, an optical signal to noise ratio from the receiver 526, and (2) an input phase and amplitude of each corresponding mode in the original received signal 516. In turn, the trained model is able to determine the complex phase and amplitude characteristics of the incident wavefront of the received optical signal 516 at a given time instance based on the corresponding intensity monitoring data at that time instance.

In more detail, the trained model is premised on the notion that modes excited within the lantern's multi-mode fiber (MMF) 406 are a function of the electric field of the received signal 516. Accordingly, by measuring the relative power in each mode at the lantern's SMF output 404, it is possible to reconstruct spatial information in respect of the input beam 516 (you can put references here). Further, the combination of modes excited within a MMF 406 is a function of both phase and amplitude of the incoming light. Therefore, if the power in each mode of the SMF is known, it is possible to infer a configuration of the complex wavefront of the beam 516.

In at least some example cases, the deep learning model is able to determine the Zernike modes or polynomials associated with the aberrations in the incident wavefront (i.e., in the received beam). In this manner, the deep learning model may be considered to be an "intensity output"-to-"Zernike mode mapping" deep leaning model. The Zernike polynomial terms can correspond for example, to x- and y-tilt, focus, primary and secondary astigmatism, primary and secondary coma, etc. as is known in the art. The deep learning model may be initially trained to accommodate for the unique behavior of the photonic lantern 400.

An example of a trained Zernike mode deep learning model which can be hosted and executed on the controller 520 (as well as a method for training such a model) may be analogous to that disclosed in Norris, B. R. M., Wei, J., Betters, C. H. et al. *An all-photonic focal-plane wavefront sensor*. Nat Commun 11, 5335 (2020). https://doi.org/10.1038/s41467-020-19117-w, which is hereby incorporated in its entirety herein by reference.

Controller 520 may control the fine steering actuator 505b to maintain the determined wavefront properties from the deep learning model, and in turn, provide precision pointing and stabilization. That is, a closed-loop is generated in which the controller 520, (i) adjusts the fine steering mirror, (ii) monitors the intensities of the single modes generated from the intensity sensor array 808b, and (iii) determines whether the Zernike modes are being maintained constant. If the Zernike modes are not maintained, the fine steering mirror is adjusted to maintain the Zernike modes. In this manner, changes in the determined Zernike wavefront coefficients are used as a guide to determine if there is jitter or stabilization in the received signal. For example, the controller 520 can determine the Zernike wavefront coefficients at a first time instance, and then again determine the Zernike wavefront coefficient at a subsequent second time instance. The controller 520 can then determine an error between the Zernike coefficients, and may then control the fine steering assembly 505 to internally re-direct the incoming signal 516 such as to minimize the determined error.

To this end, the determined Zernike wavefront coefficients can assist the controller 520 in determining how to adjust the fine steering actuator 505b to maintain precision control. For example, the controller 520 may store a pre-defined mapping between different adjustments to the fine steering mirror and specific changes in specific Zernike mode coefficients. In other cases, this may be performed using a similar method as disclosed in Cruz-Delgado et al., "*Photonic lantern tip/tilt detector for adaptive optics systems*", Opt. Lett., 46(13), 2021, which is hereby incorporated in its entirety herein by reference.

In view of the foregoing, the system 800 provides fine steering tracking and correction using only the photonic lantern 400, which as previously explained, also acts as a photonic diplexer for combining transmit and receive channels. In particular, use of the photonic lanterns avoids the requirement for additional optical and electronic elements, including a beam splitter and an independent ATS sensor optical path. To this end, the array of intensity sensor(s) 808 acts as the ATS in the system 800.

As shown, the controller 508 may also communicate with the phase shifting array 536b'. The phase shifting array 536b' may include opto-electronic hardware for removing phase shifts from each incoming received signal 850. In this manner, the multiple single modes may be recombined into a single mode received signal (see recombiner 890, e.g., passive slicing), which is passed to the receiver 526, via a single mode fiber (SMF) 892. The phase shifting array 536b' may remove the phase shifts based on phase shift information received from the controller 810 after applying the deep learning model. In this manner, the output of the deep learning model can also be used to re-generate a single mode received signal, which is further processed by a receiver 526. In various cases, a digital signal processor (DSP) may also be located ahead of the receiver 526, to initially receive the output of the phase shift array 536b'.

Figure 9:
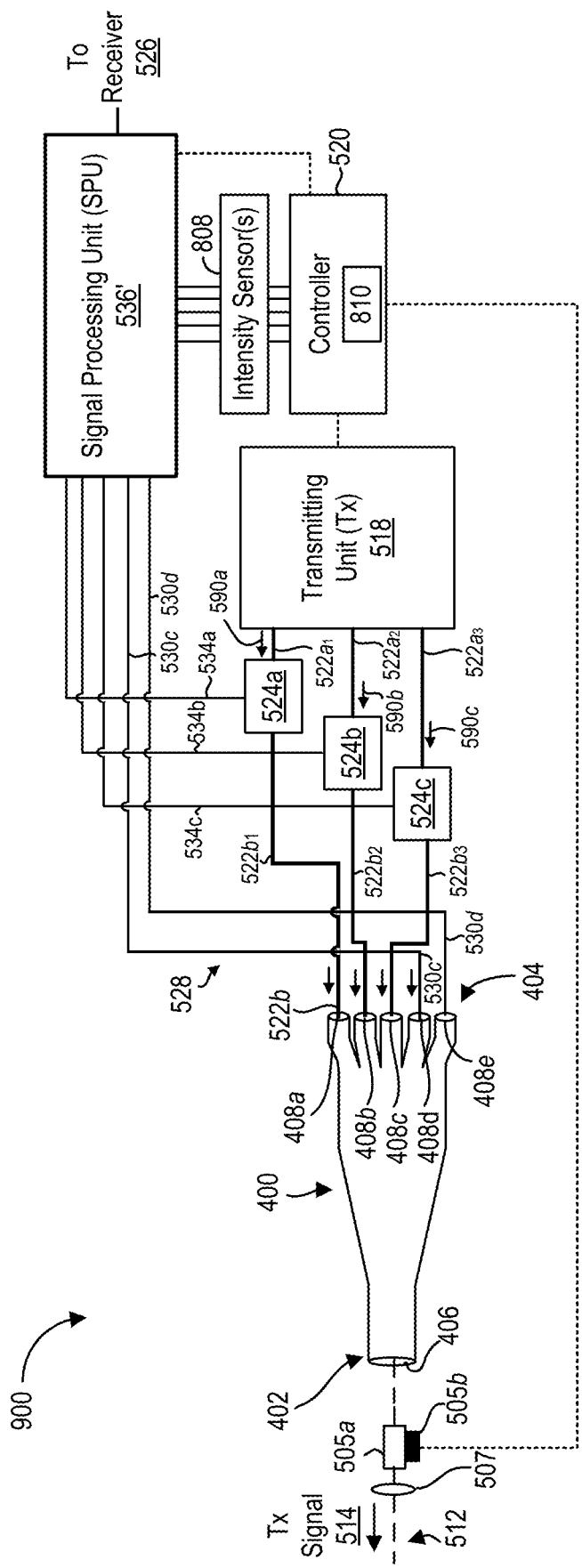
FIG. 9 shows another example optical communication system using a photonic lantern for fine point tracking.

Reference is now made to FIG. 9, which show another example for an optical communication system 900 using a photonic lantern for fine point tracking.

Communication system 900 is generally analogous to communication system 800, with the exception that a greater number of optical directional couplers 524a-524b are provided.

In the exemplified case, a first coupler 524a is interposed between the transmitting unit 518 and a first SMF 408a. Further, a second coupler 524b is interposed between the transmitting unit 518 and a second SMF 408b. Still further, a third coupler 524c is interposed between the transmitting unit 518 and a third SMF 408c.

Each coupler 524a-524c may be connected to the transmitting unit 518 via a corresponding first transmission path portion $522a_1$-$522a_3$. Further, each coupler 524a-524c may be connected to a respective SMF 408a-408c via a corresponding second transmission path portion $522b_1$-$522b_3$. Still further, each coupler 524a-524c may connect to the signal processing unit (SPU) 536' via a respective intermediate path portion 534a-534c.

In other cases, any other number of couplers may be provided and interposed between different SMFs 408 and the transmitting unit 518.

Remaining SMFs 408c, 408d may be directly coupled to the SPU 536' via respective receiving path portions 530c, 530d.

During reception of a signal, each coupler 524a-524c may be configured to route a single mode received at a respective SMF 408a-408c to the SPU' 536', as discussed previously.

During transmission of a signal, the transmitting unit 518 is able to transmit different single modes 590a-590c (i.e., concurrently or at different times) to the respective SMF 408a-408c. For example, each mode may correspond to a separate transmission communication channel. Each mode 590a-590c may have a different phase shift applied by the transmitting unit 518. Here, the photonic lantern 400 may act as a multiplexer to multiplex the various concurrently transmitted signals 590a-590c into a single transmitted signal 514 which is a combination of multiple co-propagating modes.

Figure 10:
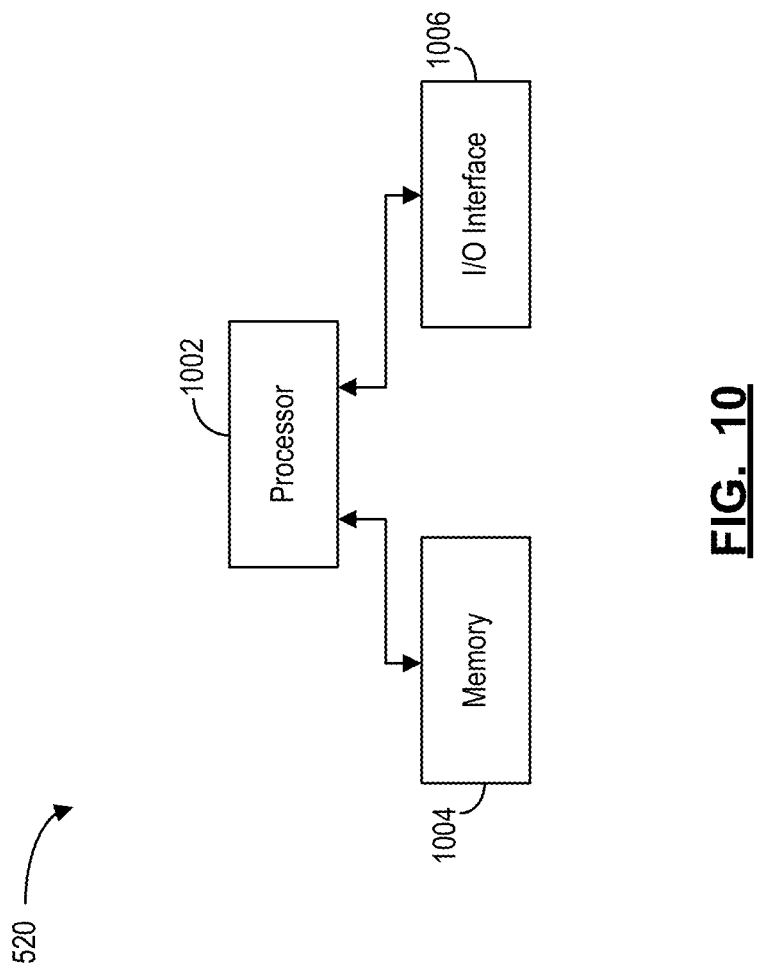
FIG. 10 shows a simplified hardware block diagram for an example of a controller used in an optical communication system.

Reference is now made to FIG. 10, which shows a simplified block diagram of an example of a controller 520.

As shown, controller 520 may include a processor 1002 coupled, via a data bus, to one or more of memory 1004 and an input/output (I/O) interface 1006.

Processor 1002 is a computer processor, such as a general-purpose microprocessor. In some other cases, processor 1002 may be a field programmable gate array, application specific integrated circuit, microcontroller, or other suitable computer processor. In some cases, processor 1002 may comprise multiple processors.

Processor 1002 is coupled, via a computer data bus, to memory 1004. Memory 1004 may include both volatile and non-volatile memory. Non-volatile memory stores computer programs consisting of computer-executable instructions, which may be loaded into volatile memory for execution by processor 1004 as needed. It will be understood by those of skill in the art that references herein to controller 520 as carrying out a function or acting in a particular way imply that processor 1002 is executing instructions (e.g., a software program) stored in memory 1004 and possibly transmitting or receiving inputs and outputs via one or more interface. Memory 1004 may also store data input to, or output from, processor 1002 in the course of executing the computer-executable instructions. In at least some example cases, memory 1004 may store the trained output intensity-to-Zernike mode mapping trained deep learning model 810.

I/O interface 1006 can be used to couple the controller 520 to other external systems and devices, such as to the intensity sensor array 808 and the fine point actuator 505b.

Various apparatuses or processes have been described herein to provide an example of at least one embodiment of the claimed subject matter. No embodiment described limits any claimed subject matter and any claimed subject matter may cover processes, apparatuses, devices or systems that differ from those described. The claimed subject matter is not limited to apparatuses, devices, systems or processes having all of the features of any one apparatus, device, system or process described or to features common to multiple or all of the apparatuses, devices, systems or processes described. It is possible that an apparatus, device, system or process described is not an embodiment of any claimed subject matter. Any subject matter that is disclosed in an apparatus, device, system or process described that is not claimed in this document may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example systems and methods described herein may be implemented as a combination of hardware or software. In some cases, the examples described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

Some elements that are used to implement at least part of the systems, methods, and devices described herein may be implemented via software that is written in a high-level procedural language such as object-oriented programming. The program code may be written in C++, C #, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having at least one processor, an operating system, and the associated hardware and software that is used to implement the functionality of at least one of the methods described herein. The software program code, when read by the device, configures the device to operate in a new, specific, and predefined manner (e.g., as a specific-purpose computer) in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An optical communication system, comprising:
    a photonic lantern, the photonic lantern extending between a first open end and a second open end, wherein,
        the first open end comprises an opening to a single multi-mode fiber, the first open end being coupled to an external signal path, and
        the second open end comprises a plurality of single mode fibers adiabatically coupled to the multi-mode fiber, the plurality of single-mode fibers include a single-mode fiber adapted to carry a fundamental optical mode and the remaining single-mode fibers adapted to carry higher-order optical modes, and
        at least one of the single-mode fibers is coupled to a signal transmitting path, and the remaining single-mode fibers are coupled to a signal receiving path;
    a signal processing unit coupled to the at least one single-mode fiber via an optical directional coupler, and to the remaining single-mode fibers via separate receiving path connections, wherein the signal processing unit includes one or more fiber splitters to sample a fraction of the received signal in each single mode fiber;
    one or more intensity sensors positioned in one arm of each fiber splitter, and used for monitoring fiber-specific intensity data associated with each of the single-mode fibers;
    a fine pointing assembly, disposed along the external signal path, and upstream of the photonic lantern, the fine pointing assembly comprising a fast steering optical element and a driver for controlling the fast steering optical element;
    a controller coupled to the one or more intensity sensors and the driver, the controller being configured to:
        receive, from the one or more intensity sensors, the fiber-specific intensity data associated with each of the single-mode fibers;
        based on the fiber-specific intensity data, determine a configuration of an incident wavefront on the fast steering mirror, wherein the configuration is determined using a neural network model trained to associate a non-linear relationship between fiber-specific intensity data and the incident wavefront configuration; and
        based on the determined incident wavefront configuration, transmit control data to the driver to control the fast steering mirror to stabilize the incident wavefront.

2. The system of claim 1, wherein the incident wavefront configuration comprises the wavefront phase and wavefront amplitude.

3. The system of claim 1, wherein the neural network model associates fiber-specific intensity data to Zernike terms associated with the incident wavefront.

4. The system of claim 1, wherein the signal processing unit comprises an in-line fiber wavelength filter, a pre-amplifier array and a phase shifting array.

5. The system of claim 4, wherein the in-line fiber wavelength filter comprises a Fiber Bragg Grating (FBG) array.

6. The system of claim 4, wherein the fiber splitters are positioned between the pre-amplifier array and the phase shifting array.

7. The system of claim 6, wherein the controller is further configured to transmit phase data for each mode, based on the configuration of the incident wavefront, to the phase shifting array.

8. The system of claim 7, wherein the phase shifting array is configured to perform phase shift compensation between multiple single modes to generate a single mode received signal.

9. The system of claim 1, wherein the at least one single-mode fiber coupled to the signal transmitting path corresponds to the fundamental mode, and the photonic lantern is a mode-specific lantern.

10. The system of claim 1, wherein the optical directional coupler comprises an optical circulator.

11. The system of claim 1, wherein the photonic lantern comprises a generic photonic lantern, wherein the transmit path is configured by adjusting the distribution of phase offsets from a plurality of single mode transmit fibers into a desired free space propagating optical mode, this mode being of Gaussian distribution or a combination of multiple co-propagating modes.

12. The system of claim 1, wherein the signal processing unit is coupled to a plurality of single mode fibers via a plurality of respective optical directional couplers.

13. The system of claim 1, wherein an optical transmitting unit is coupled to the signal transmitting path.

14. The system of claim 1, wherein an optical receiving unit coupled to the signal receiving path.

15. The system of claim 1, wherein the one or more intensity sensors comprise monitoring photodiodes.

16. A free-space optical communication system, comprising:
    a photonic lantern, the photonic lantern extending between a first open end and a second open end, wherein,
        the first open end comprises an opening to a single multi-mode fiber, the first open end being coupled to an external signal path arranged to transmit transmitted signals and receive received signals through free-space, and
        the second open end comprises a plurality of single mode fibers adiabatically coupled to the multi-mode fiber, the plurality of single-mode fibers include a single-mode fiber adapted to carry a fundamental optical mode and the remaining single-mode fibers adapted to carry higher-order optical modes, and
        at least one of the single-mode fibers is coupled to a signal transmitting path, and the remaining single-mode fibers are coupled to a signal receiving path;
    a signal processing unit coupled to the at least one single-mode fiber via an optical directional coupler, and to the remaining single-mode fibers via separate receiving path connections, wherein the signal processing unit includes one or more fiber splitters to sample a fraction of the received signal in each single mode fiber;

one or more intensity sensors positioned in one arm of each fiber splitter, and used for monitoring fiber-specific intensity data associated with each of the single-mode fibers;

a fine pointing assembly, disposed along the external signal path, and upstream of the photonic lantern, the fine pointing assembly comprising a fast steering optical element and a driver for controlling the fast steering optical element;

a controller coupled to the one or more intensity sensors and the driver, the controller being configured to:
  receive, from the one or more intensity sensors, the fiber-specific intensity data associated with each of the single-mode fibers;
  based on the fiber-specific intensity data, determine a configuration of an incident wavefront on the fast steering mirror, wherein the configuration is determined using a neural network model trained to associate a non-linear relationship between fiber-specific intensity data and the incident wavefront configuration; and
  based on the determined incident wavefront configuration, transmit control data to the driver to control the fast steering mirror to stabilize the incident wavefront thereby applying an appropriate displacement angle to displace the received signals from the transmitted signals.

17. The system of claim 16, wherein the displacement angle is a receive-behind angle defined such that an outgoing wavefront of the transmitted signals is tilted with respect to an incoming wavefront of the received signals to compensate for transverse velocity between the free-space optical communication system and a remote terminal when considering the finite speed of light such that the outgoing transmitted signals will intersect a future position of the remote terminal.

18. The system of claim 16, wherein the neural network model associates fiber-specific intensity data to Zernike terms associated with the incident wavefront.

19. The system of claim 16, wherein the at least one single-mode fiber coupled to the signal transmitting path corresponds to the fundamental mode, and the photonic lantern is a mode-specific lantern.

20. The system of claim 16, wherein the photonic lantern comprises a generic photonic lantern, wherein the transmit path is configured by adjusting the distribution of phase offsets from a plurality of single mode transmit fibers into a desired free space propagating optical mode, this mode being of Gaussian distribution or a combination of multiple co-propagating modes.

* * * * *